United States Patent
Venugopal et al.

(10) Patent No.: US 11,595,986 B2
(45) Date of Patent: Feb. 28, 2023

(54) TECHNIQUES FOR CROSS-COMPONENT CARRIER SCHEDULING OF A JOINT DOWNLINK AND UPLINK TRANSMISSION CONFIGURATION INDICATOR STATE

(71) Applicant: QUALCOMM Incorporated, San Diego, CA (US)

(72) Inventors: Kiran Venugopal, Raritan, NJ (US); Yan Zhou, San Diego, CA (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 163 days.

(21) Appl. No.: 17/107,900

(22) Filed: Nov. 30, 2020

(65) Prior Publication Data
US 2022/0174714 A1    Jun. 2, 2022

(51) Int. Cl.
*H04W 72/12*    (2009.01)
*H04L 5/00*    (2006.01)

(52) U.S. Cl.
CPC ....... *H04W 72/1289* (2013.01); *H04L 5/0053* (2013.01); *H04L 5/0094* (2013.01); *H04W 72/1284* (2013.01)

(58) Field of Classification Search
CPC .......... H04W 72/1289; H04W 72/1284; H04L 5/0053; H04L 5/0094
(Continued)

(56) References Cited

U.S. PATENT DOCUMENTS

2022/0061056 A1*  2/2022  Farag ............... H04W 80/02
2022/0104043 A1*  3/2022  Farag ............... H04W 24/10
(Continued)

FOREIGN PATENT DOCUMENTS

EP    3890205 A1    10/2021

OTHER PUBLICATIONS

Apple Inc: "On Beam Management Enhancement", 3GPP TSG RAN WG1 Meeting #103-e, 3GPP Draft, R1-2008438, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26-Nov. 13, 2020, Oct. 24, 2020 (Oct. 24, 2020), XP051946661, Retrieved from the Internet: URL: https://www.3gpp.org/ftp/TSG_RAN/WG1_RL1/TSGR1_103-e/Docs/R1-2008438.zip, R1-2008438 On Beam Management Enhancement.docx, [retrieved on Oct. 24, 2020], Sections 2, 4.
(Continued)

*Primary Examiner* — Peter G Solinsky
(74) *Attorney, Agent, or Firm* — Dalei Dong; Holland & Hart LLP

(57) ABSTRACT

Methods, systems, and devices for wireless communications are described. A user equipment (UE) may receive control signaling including scheduling information. The scheduling information may include an indication of a joint downlink and uplink transmission configuration indicator (TCI) state for a common beam. The UE may apply the joint downlink and uplink TCI state at the component carriers to activate the common beam to transmit one or more uplink transmissions or to receive one or more downlink transmissions at the UE. The UE may schedule communications with a base station, one or more transmission reception points (TRPs), or both across the component carriers and using the common beam. The communications may include transmitting at least one uplink transmission during one or more uplink resources
(Continued)

indicated in the scheduling information and receiving at least one downlink transmission during one or more downlink resources indicated in the scheduling information.

30 Claims, 20 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2022/0109549 | A1* | 4/2022 | Abotabl | H04L 5/14 |
| 2022/0116859 | A1* | 4/2022 | Park | H04W 72/042 |
| 2022/0124782 | A1* | 4/2022 | Park | H04W 72/044 |

OTHER PUBLICATIONS

International Search Report and Written Opinion—PCT/US2021/072149—ISA/EPO—Feb. 18, 2022 (2100687WO).

Qualcomm Incorporated: "Enhancements on Multi-Beam Operation", 3GPP TSG RAN WG1 Meeting #103-e, 3GPP Draft, R1-2009250, 3rd Generation Partnership Project (3GPP), Mobile Competence Centre, 650, Route Des Lucioles, F-06921 Sophia-Antipolis Cedex, France, vol. RAN WG1, No. e-meeting, Oct. 26-Nov. 13, 2020, 12 Pages, Oct. 24, 2020 (Oct. 24, 2020), XP051946913, Retrieved from the Internet: URL: https://www.3gpp.org/ftp/TSG_RAN/WG1_RL1/TSGR1_103-e/Docs/R1-2009250.zip, R1-2009250 Enhancements on Multi-beam Operation.docx [retrieved on Oct. 24, 2020], p. 8-p. 9, Sections 1, 1.Issue 1.

ZTE: "Enhancements on Multi-Beam Operation", 3GPP TSG RAN WG1 Meeting #103-e, 3GPP Draft, R1-2007763, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26-Nov. 13, 2020, Oct. 24, 2020 (Oct. 24, 2020), 19 Pages, XP051946497, Retrieved from the Internet: URL: https://www.3gpp.org/ftp/TSG_RAN/WG1_RL1/TSGR1_103-e/Docs/R1-2007763.zip, R1-2007763 Enhancements on multi-beam operation.docx, [retrieved on Oct. 24, 2020], Sections 2.1.2, 2.2.2, 2.2.3, 2.4.

* cited by examiner

|  | Component Carrier 235-a |  | Component Carrier 235-c |

Component Carrier 235-b

Scheduling Information 405

Common Beam 415

US 11,595,986 B2

TECHNIQUES FOR CROSS-COMPONENT CARRIER SCHEDULING OF A JOINT DOWNLINK AND UPLINK TRANSMISSION CONFIGURATION INDICATOR STATE

FIELD OF DISCLOSURE

The following relates to wireless communications, including techniques for cross-component carrier scheduling of a joint downlink and uplink transmission configuration indicator (TCI) state.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support techniques for cross-component carrier scheduling of a joint downlink and uplink transmission configuration indicator (TCI) state. The described techniques provide for a user equipment (UE) to receive control signaling including scheduling information from a base station or a transmission reception point (TRP). The scheduling information may include an indication of a joint downlink and uplink TCI state identifier for a common beam, a scheduling request indicator (SRI) field indicating the common beam or mapping to the joint downlink and uplink TCI state, an indication of the common beam, one or more TRP identifiers, or a combination. The UE may apply the joint downlink and uplink TCI state at the component carriers to activate the common beam to transmit one or more uplink transmissions or to receive one or more downlink transmissions at the UE. In some cases, the UE may schedule communications with a base station, one or more TRPs, or both across the component carriers and using the common beam. The communications may include transmitting at least one uplink transmission during one or more uplink resources indicated in the scheduling information and receiving at least one downlink transmission during one or more downlink resources indicated in the scheduling information.

A method for wireless communications at a UE is described. The method may include receiving control signaling including scheduling information for one or more downlink resources and one or more uplink resources across a set of multiple component carriers based on a joint downlink and uplink TCI state, where the joint downlink and uplink TCI state is associated with one or more of the set of multiple component carriers based on a component carrier list and communicating with a base station based on a common beam corresponding to the joint downlink and uplink TCI state.

An apparatus for wireless communications at a UE is described. The apparatus may include a processor, memory in electronic communication with the processor, and instructions stored in the memory. The instructions may be executable by the processor to cause the apparatus to receive control signaling including scheduling information for one or more downlink resources and one or more uplink resources across a set of multiple component carriers based on a joint downlink and uplink TCI state, where the joint downlink and uplink TCI state is associated with one or more of the set of multiple component carriers based on a component carrier list and communicate with a base station based on a common beam corresponding to the joint downlink and uplink TCI state.

Another apparatus for wireless communications at a UE is described. The apparatus may include means for receiving control signaling including scheduling information for one or more downlink resources and one or more uplink resources across a set of multiple component carriers based on a joint downlink and uplink TCI state, where the joint downlink and uplink TCI state is associated with one or more of the set of multiple component carriers based on a component carrier list and means for communicating with a base station based on a common beam corresponding to the joint downlink and uplink TCI state.

A non-transitory computer-readable medium storing code for wireless communications at a UE is described. The code may include instructions executable by a processor to receive control signaling including scheduling information for one or more downlink resources and one or more uplink resources across a set of multiple component carriers based on a joint downlink and uplink TCI state, where the joint downlink and uplink TCI state is associated with one or more of the set of multiple component carriers based on a component carrier list and communicate with a base station based on a common beam corresponding to the joint downlink and uplink TCI state.

In some examples of the method, apparatuses, and non-transitory computer-readable medium described herein, receiving the control signaling may include operations, features, means, or instructions for receiving an indication of the joint downlink and uplink TCI state.

In some examples of the method, apparatuses, and non-transitory computer-readable medium described herein, the indication may be a field in the control signaling including a joint downlink and uplink TCI state identifier.

In some examples of the method, apparatuses, and non-transitory computer-readable medium described herein, the indication includes a field in an SRI.

In some examples of the method, apparatuses, and non-transitory computer-readable medium described herein, communicating with the base station may include operations, features, means, or instructions for receiving a downlink transmission from the base station using the one or more downlink resources and transmitting an uplink transmission to the base station using the one or more uplink resources.

Some examples of the method, apparatuses, and non-transitory computer-readable medium described herein may further include operations, features, means, or instructions for scheduling the downlink transmission and the uplink transmission across the set of multiple component carriers based on the set of multiple component carriers sharing a same analog beam with the common beam corresponding to the joint downlink and uplink transmission configuration indictor state.

Some examples of the method, apparatuses, and non-transitory computer-readable medium described herein may further include operations, features, means, or instructions for receiving, from a component carrier of the set of multiple component carriers, an indication of the common beam for one or more downlink channels and one or more uplink channels across the set of multiple component carriers.

In some examples of the method, apparatuses, and non-transitory computer-readable medium described herein, receiving the control signaling may include operations, features, means, or instructions for receiving first control signaling including a first indication of the component carrier list, the component carrier list including the one or more of the set of multiple component carriers and receiving second control signaling including a second indication of the joint downlink and uplink TCI state.

In some examples of the method, apparatuses, and non-transitory computer-readable medium described herein, the one or more of the set of multiple component carriers share a same analog beam.

In some examples of the method, apparatuses, and non-transitory computer-readable medium described herein, the one or more of the set of multiple component carriers support the joint downlink and uplink TCI state.

In some examples of the method, apparatuses, and non-transitory computer-readable medium described herein, the one or more of the set of multiple component carriers support a downlink TCI state or an uplink TCI state.

A method for wireless communications at a UE is described. The method may include receiving control signaling including scheduling information for one or more downlink resources and one or more uplink resources associated with a common beam across a set of multiple TRPs and communicating with one or more TRPs of the set of multiple TRPs across a set of multiple component carriers based on the common beam, where a joint downlink and uplink TCI state is associated with the communications with the one or more TRPs.

An apparatus for wireless communications at a UE is described. The apparatus may include a processor, memory in electronic communication with the processor, and instructions stored in the memory. The instructions may be executable by the processor to cause the apparatus to receive control signaling including scheduling information for one or more downlink resources and one or more uplink resources associated with a common beam across a set of multiple TRPs and communicate with one or more TRPs of the set of multiple TRPs across a set of multiple component carriers based on the common beam, where a joint downlink and uplink TCI state is associated with the communications with the one or more TRPs.

Another apparatus for wireless communications at a UE is described. The apparatus may include means for receiving control signaling including scheduling information for one or more downlink resources and one or more uplink resources associated with a common beam across a set of multiple TRPs and means for communicating with one or more TRPs of the set of multiple TRPs across a set of multiple component carriers based on the common beam, where a joint downlink and uplink TCI state is associated with the communications with the one or more TRPs.

A non-transitory computer-readable medium storing code for wireless communications at a UE is described. The code may include instructions executable by a processor to receive control signaling including scheduling information for one or more downlink resources and one or more uplink resources associated with a common beam across a set of multiple TRPs and communicate with one or more TRPs of the set of multiple TRPs across a set of multiple component carriers based on the common beam, where a joint downlink and uplink TCI state is associated with the communications with the one or more TRPs.

In some examples of the method, apparatuses, and non-transitory computer-readable medium described herein, receiving the control signaling may include operations, features, means, or instructions for receiving an indication of the joint downlink and uplink TCI state and one or more TRP identifiers corresponding to the one or more TRPs and scheduling the communications based on the indication.

In some examples of the method, apparatuses, and non-transitory computer-readable medium described herein, the indication may be a field in the control signaling including a joint downlink and uplink TCI state identifier and the one or more TRP identifiers.

In some examples of the method, apparatuses, and non-transitory computer-readable medium described herein, the indication includes a field in an SRI.

In some examples of the method, apparatuses, and non-transitory computer-readable medium described herein, communicating with the one or more TRPs may include operations, features, means, or instructions for receiving a downlink transmission using the one or more downlink resources and transmitting an uplink transmission using the one or more uplink resources.

A method for wireless communications at a base station is described. The method may include transmitting, to a UE, control signaling including scheduling information for one or more downlink resources and one or more uplink resources across a set of multiple component carriers based on a joint downlink and uplink TCI state, where the joint downlink and uplink TCI state is associated with one or more of the set of multiple component carriers based on a component carrier list and communicating with the UE based on a common beam corresponding to the joint downlink and uplink TCI state.

An apparatus for wireless communications at a base station is described. The apparatus may include a processor, memory in electronic communication with the processor, and instructions stored in the memory. The instructions may be executable by the processor to cause the apparatus to transmit, to a UE, control signaling including scheduling information for one or more downlink resources and one or more uplink resources across a set of multiple component carriers based on a joint downlink and uplink TCI state, where the joint downlink and uplink TCI state is associated with one or more of the set of multiple component carriers based on a component carrier list and communicate with the UE based on a common beam corresponding to the joint downlink and uplink TCI state.

Another apparatus for wireless communications at a base station is described. The apparatus may include means for transmitting, to a UE, control signaling including scheduling information for one or more downlink resources and one or more uplink resources across a set of multiple component carriers based on a joint downlink and uplink TCI state, where the joint downlink and uplink TCI state is associated with one or more of the set of multiple component carriers based on a component carrier list and means for communicating with the UE based on a common beam corresponding to the joint downlink and uplink TCI state.

A non-transitory computer-readable medium storing code for wireless communications at a base station is described. The code may include instructions executable by a processor to transmit, to a UE, control signaling including scheduling information for one or more downlink resources and one or more uplink resources across a set of multiple component carriers based on a joint downlink and uplink TCI state, where the joint downlink and uplink TCI state is associated with one or more of the set of multiple component carriers based on a component carrier list and communicate with the UE based on a common beam corresponding to the joint downlink and uplink TCI state.

In some examples of the method, apparatuses, and non-transitory computer-readable medium described herein, transmitting the control signaling may include operations, features, means, or instructions for transmitting an indication of the joint downlink and uplink TCI state.

In some examples of the method, apparatuses, and non-transitory computer-readable medium described herein, the indication may be a field in the control signaling including a joint downlink and uplink TCI state identifier.

In some examples of the method, apparatuses, and non-transitory computer-readable medium described herein, the indication includes a field in an SRI.

In some examples of the method, apparatuses, and non-transitory computer-readable medium described herein, communicating with the UE may include operations, features, means, or instructions for transmitting a downlink transmission to the UE using the one or more downlink resources and receiving an uplink transmission from the UE using the one or more uplink resources.

Some examples of the method, apparatuses, and non-transitory computer-readable medium described herein may further include operations, features, means, or instructions for scheduling the downlink transmission and the uplink transmission across the set of multiple component carriers based on the set of multiple component carriers sharing a same analog beam with the common beam corresponding to the joint downlink and uplink transmission configuration indictor state.

Some examples of the method, apparatuses, and non-transitory computer-readable medium described herein may further include operations, features, means, or instructions for transmitting, from a component carrier of the set of multiple component carriers, an indication of the common beam for one or more downlink channels and one or more uplink channels across the set of multiple component carriers.

In some examples of the method, apparatuses, and non-transitory computer-readable medium described herein, transmitting the control signaling may include operations, features, means, or instructions for transmitting first control signaling including a first indication of the component carrier list, the component carrier list including the one or more of the set of multiple component carriers and transmitting second control signaling including a second indication of the joint downlink and uplink TCI state.

In some examples of the method, apparatuses, and non-transitory computer-readable medium described herein, the one or more of the set of multiple component carriers share a same analog beam.

In some examples of the method, apparatuses, and non-transitory computer-readable medium described herein, the one or more of the set of multiple component carriers support the joint downlink and uplink TCI state.

In some examples of the method, apparatuses, and non-transitory computer-readable medium described herein, the one or more of the set of multiple component carriers support a downlink TCI state or an uplink TCI state.

DETAILED DESCRIPTION

Figure 1:
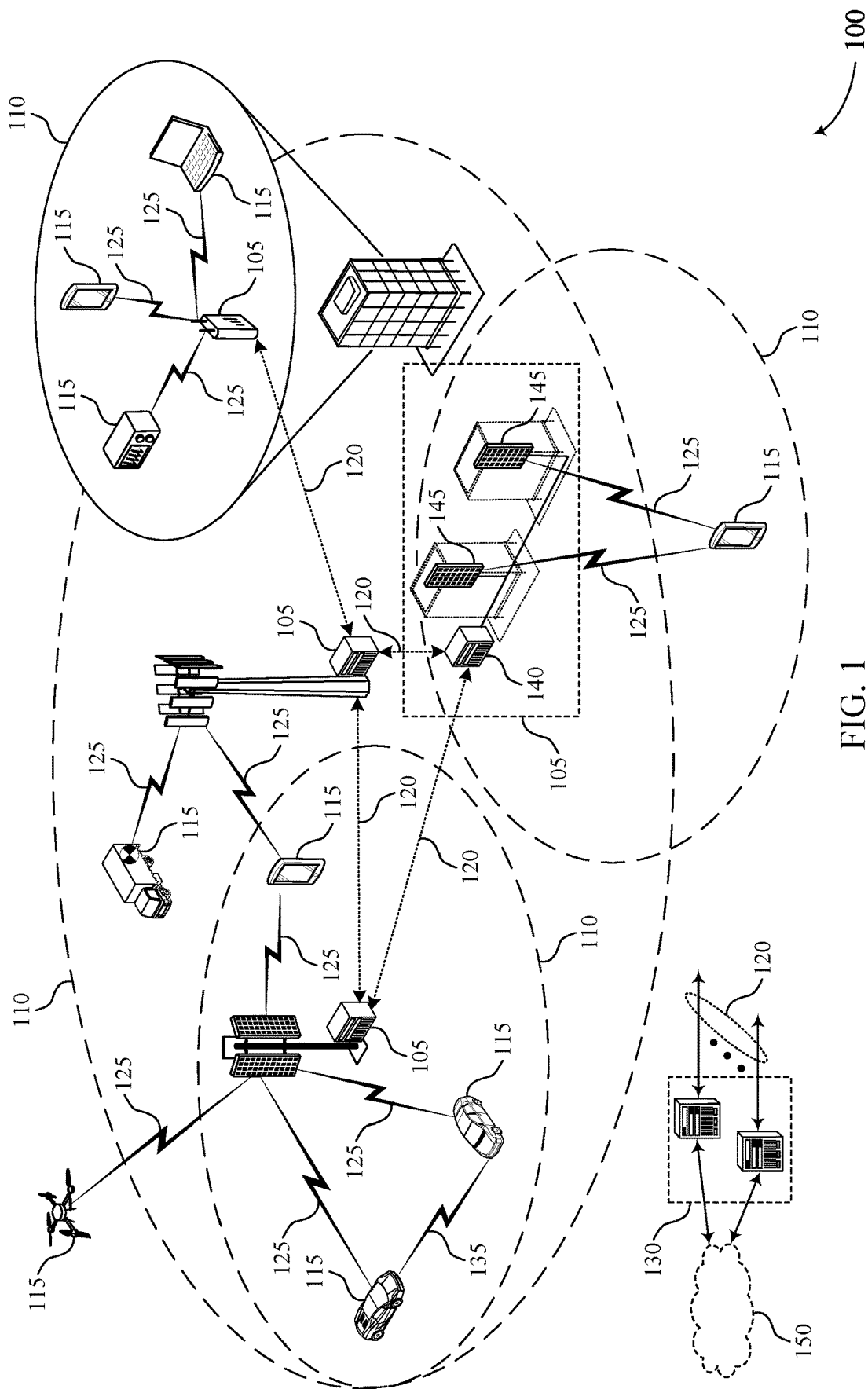
FIGS. 1 through 3 illustrate examples of wireless communications systems that supports techniques for cross-component carrier scheduling of a joint downlink and uplink transmission configuration indicator (TCI) state in accordance with aspects of the present disclosure.

In some wireless communications systems, a user equipment (UE) may be configured with beam indications, such as a transmission configuration indicators (TCIs), for both downlink and uplink resources of one or more beams. For example, the UE may receive signaling configuring the UE to operate in a TCI state. The UE may decode a downlink transmission from a base station based on a TCI state for a beam used for the downlink transmission. Similarly, the UE may transmit an uplink transmission to a base station based on a TCI state for a beam used for the uplink transmission. In some examples, such as when the UE communicates across multiple component carriers, the UE may communicate downlink and uplink transmissions using a common beam. Thus, operating based on separate TCI states for uplink and for downlink communications may result in additional processing time as well as signaling and network overhead. Therefore, the UE may use a joint downlink and uplink TCI state to communicate downlink and uplink transmissions across multiple component carriers using a common beam. However, there may be no current method for the UE to schedule the joint downlink and uplink TCI state for multiple component carriers, multiple transmission reception points (TRPs), or both.

As described herein, a base station or TRP may transmit control signaling to a UE that may schedule downlink and uplink communications for a common beam across multiple component carriers, multiple TRPs, or both. In some examples, the UE may receive control signaling, such as a downlink control information (DCI) message, from a base station or a TRP on a first component carrier (CC1). The control signaling may include an indication of a joint downlink and uplink TCI state identifier for a joint downlink and uplink TCI state that schedules communications across multiple component carriers sharing an analog beam with a same common beam. Additionally or alternatively, the control signaling may include a field in a scheduling request indicator (SRI) that may indicate a common beam or may be mapped to the joint downlink and uplink TCI state. The UE may determine which component carriers share the analog beam based on a component carrier list, which may be included in different control signaling (e.g., radio resource control (RRC) signaling). The component carrier list may indicate component carriers that support the joint downlink and uplink TCI state or may reuse a cross-component carrier indication of a downlink TCI state or an uplink TCI state.

In some other examples, the UE may communicate with multiple TRPs, each TRP associated with one or more component carriers. The UE may receive control signaling that schedules communications with the multiple TRPs using a common downlink and uplink beam. For example, the UE may receive control signaling, such as a DCI message, from a first TRP (TRP1) on CC1 including an indication of a joint TCI state identifier or SRI, one or more TRP identifiers, or a combination. The control signaling may schedule one or more TRPs based on the TRP identifiers to communicate downlink and uplink transmissions using additional component carriers (e.g., a second component carrier (CC2) if one TRP identifier is included in the control signaling or multiple other component carriers if multiple TRP identifiers are included in the control signaling).

Aspects of the disclosure are initially described in the context of wireless communications systems. Aspects of the disclosure are further described in the context of a transmission diagram and process flows. Aspects of the disclosure are further illustrated by and described with reference to apparatus diagrams, system diagrams, and flowcharts that relate to techniques for cross-component carrier scheduling of a joint downlink and uplink transmission configuration indicator state.

FIG. 1 illustrates an example of a wireless communications system that supports techniques for cross-component carrier scheduling of a joint downlink and uplink TCI state in accordance with aspects of the present disclosure. Wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell may cover a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-todevice (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). For example, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

As used herein, TCI or TCI state is an example of a beam configuration or a beam configuration state, respectively, and the techniques described herein for a TCI or TCI state may also be applied to beam configuration or beam configuration states other than a TCI or TCI state. For example, a TCI state activation or deactivation for a set of TCI states may be applied to a beam configuration activation or deactivation for a set of beam configuration states, and so on. Likewise, the techniques described herein for a beam configuration or beam configuration states may also be applied in the more specific example of a TCI or TCI state.

In some cases, a UE 115 may receive an indication of a TCI or a TCI state from a base station 105, a TRP, or the like. For example, a base station 105 may indicate a TCI state for downlink communications from the base station 105 to the UE 115. However, the base station 105 and the UE 115 may manage uplink communications separately, which may use additional processing time as well as signaling and network overhead. Thus, the UE 115 and the base station 105 may use a single TCI state, which may be referred to as a joint downlink and uplink TCI state, to indicate quasi-colocation (QCL) rules to provide properties of one or more common beams used for communication in both the downlink and uplink direction. In some cases, the UE 115 may use the joint downlink and uplink TCI state to communicate in both the downlink and uplink directions across one or more TRPs, multiple component carriers (e.g., if the UE 115 supports carrier aggregation or multi-carrier operation), or both using a common beam. For example, the UE 115 may apply the joint downlink and uplink TCI state to each component carrier, to each BWP of each component carrier, or both to activate the component carriers. However, there may not be a method for the UE 115 to schedule communications across multiple component carriers, multiple TRPs, or both based on the joint downlink and uplink TCI state.

In some examples, a UE 115 may receive control signaling, such as a DCI message, including scheduling information. The scheduling information may include an indication of a joint downlink and uplink TCI state identifier for a common beam, an SRI field indicating the common beam or mapping to the joint downlink and uplink TCI state, an indication of the common beam, one or more TRP identifiers, or a combination. The UE 115 may apply the joint downlink and uplink TCI state at the component carriers to activate the common beam to transmit one or more uplink transmissions or to receive one or more downlink transmissions at the UE 115. In some examples, a base station 105 or a TRP may transmit an indication of a list of component carriers that support a joint downlink and uplink TCI state to the UE 115 (e.g., in control signaling, such as RRC signaling). The UE 115 may receive additional control signaling, such as dynamic control signaling (e.g., a DCI message), that indicates which component carriers to activate. In some cases, the UE 115 may schedule communications with a base station 105, one or more TRPs, or both across the component carriers and using the common beam. The communications may include transmitting at least one uplink transmission during one or more uplink resources indicated in the scheduling information and receiving at least one downlink transmission during one or more downlink resources indicated in the scheduling information.

Figure 2:
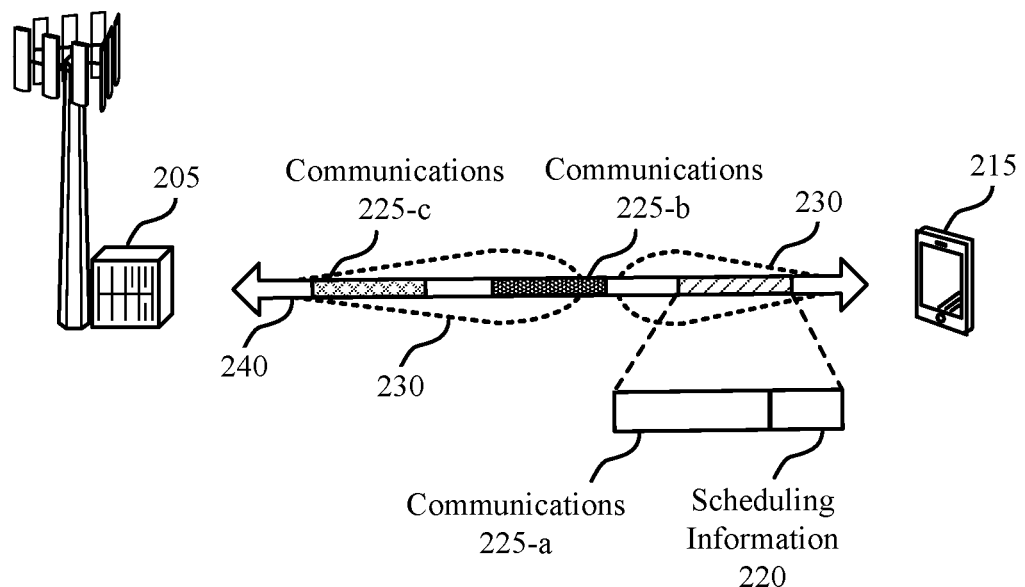
Figure 2:
Figure 2:

FIG. 2 illustrates an example of a wireless communications system that supports techniques for cross-component carrier scheduling of a joint downlink and uplink TCI state in accordance with aspects of the present disclosure. In some examples, wireless communications system 200 may implement aspects of wireless communication system 100 and may include UE 215, base station 205, and communication link 240, which may be examples of a UE 115, a base station 105, and a communication link 125 as described with reference to FIG. 1. In some examples, UE 215 may communicate with base station 205 by receiving control signaling or data via communication link 240 in a downlink transmission using one or more downlink resources, transmitting control signaling or data via communication link 240 in an uplink transmission using one or more uplink resources, or both. For example, base station 205 may transmit control signaling to UE 215 that may include scheduling information 220 for communications 225 in both the downlink and uplink direction for a common beam 230 across multiple component carriers 235.

In some cases, a UE 215 may receive an indication of a TCI or a TCI state from a base station 205 (e.g., included in a DCI message). The indication may include one or more beam configurations or beam configuration states, respectively, such as a QCL relationship between a downlink reference signal and demodulation reference signal (DMRS) ports. For example, the TCI state may include one or more QCL rules, where a rule may associate a reference signal (e.g., a synchronization signal, such as an SSB; a CSI-RS; a positioning reference signal (PRS); or other reference signal) with a channel property (e.g., a Doppler shift; a Doppler spread; an average delay; a delay spread; one or more spatial parameters, such as a spatial filter; or other properties). There may be different types of QCL (e.g., QCL-TypeA, QCL-TypeB, QCL-TypeC, or QCL-TypeD), where each type may be based on different sets of QCL rules. The base station 205 may indicate a TCI state for downlink communications from the base station 205 to the UE 215. However, the base station 205 and the UE 215 may manage uplink communications separately, which may use additional processing time as well as signaling and network overhead. Thus, the UE 215 and the base station 205 may reduce signaling and network overhead (e.g., related to beam indication) by using a single TCI state, which may be referred to as a joint downlink and uplink TCI state, to indicate QCL rules for communication in both the downlink and uplink direction. The joint downlink and uplink TCI state may enable a unified TCI framework that may simplify a beam management procedure for downlink and uplink channels, data and control channels, or both in wireless communications system 200.

In some examples, the joint downlink and uplink TCI state may indicate any number of QCL rules (e.g., three or more QCL rules) to provide properties of one or more common beams 215, where the base station 205 and the UE 215 use each common beam 230 for downlink and uplink. The UE 215 may use the joint downlink and uplink TCI state to communicate in both the downlink and uplink directions across multiple component carriers 235 using a common beam 230. For example, UE 215 may support carrier aggregation or multi-carrier operation in which base station 205 configures UE 215 with multiple downlink component carriers 235 and one or more uplink component carriers 235 according to a carrier aggregation configuration. The UE 215 may activate the joint downlink and uplink TCI state for one or more supported component carriers 235 that share a common beam 230 (e.g., based on receiving control signaling that indicates the component carriers 235). For example, the UE 215 may apply the joint downlink and uplink TCI state to each component carrier 235, to each BWP of each component carrier 235, or both to activate the component carriers 235. However, there may not be a method for the UE 215 to schedule communications across multiple component carriers 235, multiple TRPs, or both based on the joint downlink and uplink TCI state.

In some examples, UE 215 may efficiently perform downlink and uplink beam management by reducing latency and signaling overhead for inter-cell mobility (e.g., for intra-centric and Layer 1 (L1) or Layer 2 (L2)-centric inter-cell mobility), for a relatively large number of configured TCI states, or both. For example, UE 215 may perform a multi-beam operation in a frequency range, such as Frequency Range 2 (FR2) or Frequency Range 1 (FR1), using a common beam 230 for data and control signaling in both the downlink and the uplink direction (e.g., for intra-band carrier aggregation with a unified TCI framework for downlink and uplink beam indication). Additionally or alternatively, UE 215 may identify and specify features (e.g., by considering uplink coverage loss mitigation due to maximum permissible exposure (MPE)) to facilitate uplink beam selection based on an uplink beam indication with the unified TCI framework for uplink fast panel selection if UE 215 is equipped with multiple antenna panels.

In some cases, a UE 215 may receive scheduling information 220 from a base station 205 that indicates one or more uplink resources and one or more downlink resources for communications between the UE 215 and the base station 205. For example, UE 215 may receive an indication of scheduling information 220 in a DCI message, a MAC-control element (MAC-CE), or the like. In some cases, UE 215 and base station 205-b may improve signaling mechanisms, and thereby reduce latency and increase efficiency, by using dynamic control signaling to indicate scheduling information 220 (e.g., a DCI message or a MAC-CE as opposed to RRC signaling). In some examples, the scheduling information 220 may include an indication of a joint downlink and uplink TCI state identifier and may be transmitted on component carrier 235-a. In some other examples, the scheduling information 220 may include an SRI field, which may include an indication of a common beam 230 across component carriers 235. In some cases, the UE 215 may use the information in the SRI field to map to the joint downlink and uplink TCI state for the common beam 230. In some examples, the common beam 230 may be common for both transmitting an uplink transmission and receiving a downlink transmission at the UE 215, the base station 205, or both. Component carrier 235-a may indicate a common downlink and uplink beam for one or more downlink and uplink channels across component carriers 235 (e.g., component carrier 235-a through component carrier 235-c), which may include inter-band channels.

In some examples, the UE 215 may receive additional control signaling indicating a component carrier list. For example, UE 215 may receive RRC signaling including an indication of one or more component carriers 235 that share a same analog beam with a common beam 230. Additionally or alternatively, UE 215 may receive dynamic control signaling, such as a DCI message, a MAC-CE, or the like, that activates one or more of the component carriers 235 from the component carrier list (e.g., component carrier 235-a through component carrier 235-c). In some cases, the component carrier list may be dedicated to component carriers 235 that support a joint downlink and uplink TCI state. In some other cases, the component carrier list may include component carriers 235 that previously supported a downlink TCI state or an uplink TCI, but may be configured with a joint downlink and uplink TCI state for a cross-component carrier indication.

Figure 4:
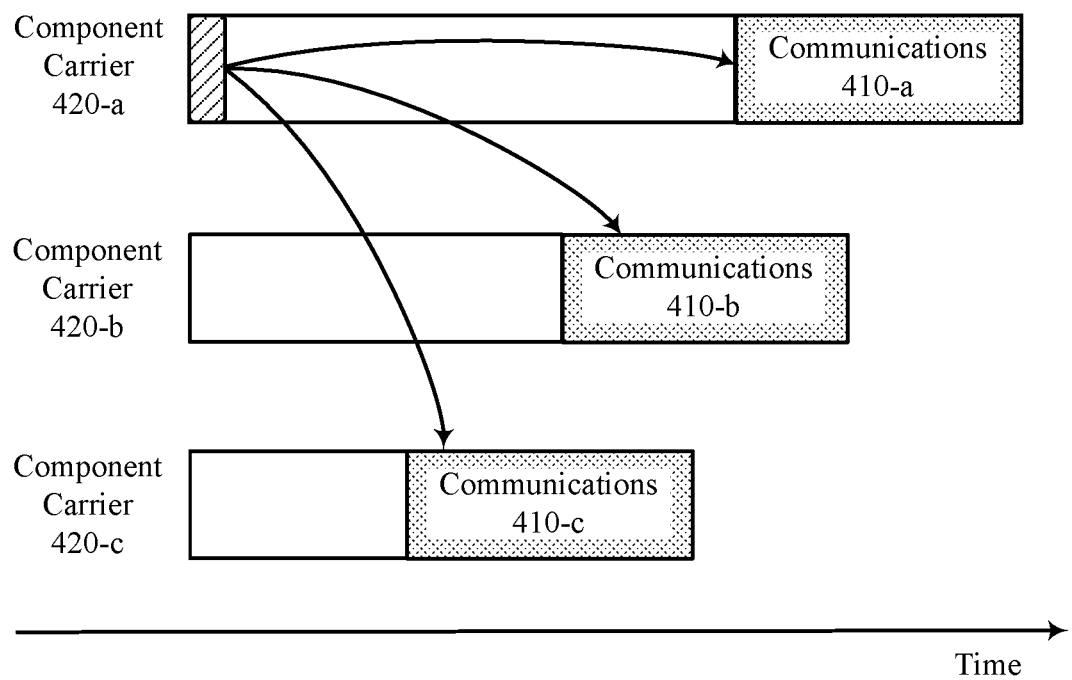
FIG. 4 illustrates an example of a transmission diagram that supports techniques for cross-component carrier scheduling of a joint downlink and uplink TCI state in accordance with aspects of the present disclosure.
Figure 4:
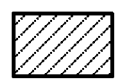
Figure 4:
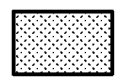
Figure 4:

In some cases, UE 215 may schedule communications 225 across multiple component carriers 235, such as communications 225-a through communications 225-c across component carrier 235-a through component carrier 235-c, respectively, based on the scheduling information 220, which is described in further detail with respect to FIG. 4. For example, UE 215 may receive a downlink transmission from base station 205 using one or more downlink resources included in the scheduling information 220. Additionally, UE 215 may transmit an uplink transmission to base station 205 using one or more uplink resources included in the scheduling information 220. UE 215 may receive the downlink transmission and may transmit the uplink transmission using component carrier 235-a, component carrier 235-b, component carrier 235-c, or a combination, on a common beam 230 (e.g., based on applying a joint downlink and uplink TCI state to the component carriers 235).

Figure 3:
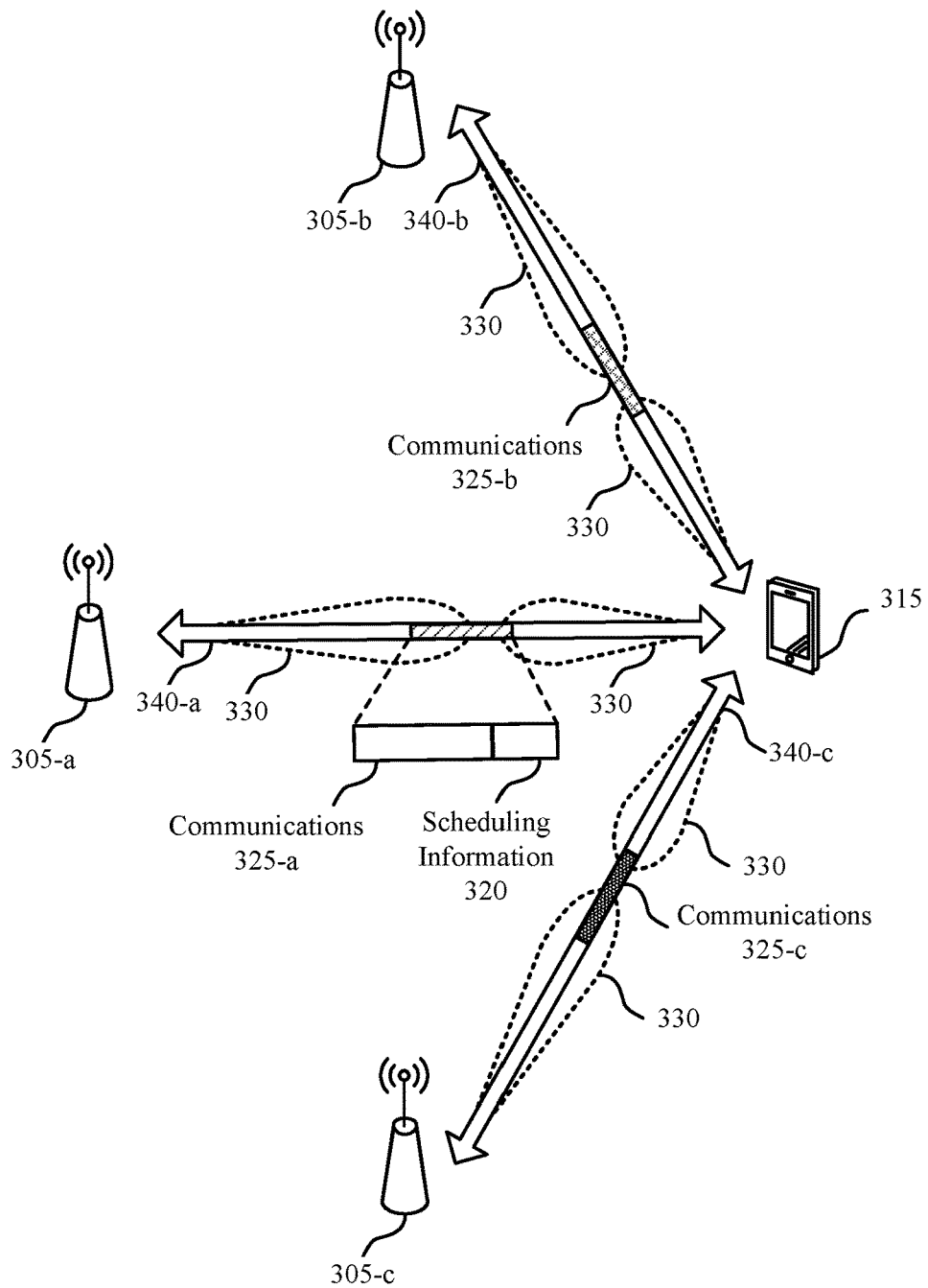

FIG. 3 illustrates an example of a wireless communications system that supports techniques for cross-component carrier scheduling of a joint downlink and uplink TCI state in accordance with aspects of the present disclosure. In some examples, wireless communications system 300 may implement aspects of wireless communication system 100, wireless communications system 200, or both. Wireless communications system 300 may include UE 315 and communication link 340-a through communication link 340-c, which may be examples of a UE 115, a UE 215, communication links 125, communication links 240, or a combination as described with reference to FIGS. 1 and 2. Additionally, wireless communication system 300 may include one or more TRPs 305, such as TRP 305-a through TRP 305-c, which may operate as a base station 105, a network node, a relay device, or the like as described with reference to FIG. 1. In some examples, UE 315 may communicate with TRP 305-a through TRP 305-c by receiving control signaling or data via communication link 340-a through communication link 340-c, respectively, in a downlink transmission using one or more downlink resources, in an uplink transmission using one or more uplink resources, or both. For example, TRP 305-a may transmit control signaling to UE 315 via communication link 340-a that may include scheduling information 320 for communications 325 in both the downlink and uplink direction for a common beam 330 across multiple component carriers 335.

In some cases, a UE 315 may receive an indication of a TCI or a TCI state from a TRP 305 (e.g., included in a DCI message). For example, the TRP 305 may indicate a TCI state for downlink communications from the TRP 305 to the UE 315. However, the TRP 305 and the UE 315 may manage uplink communications separately, which may use additional processing time as well as signaling and network overhead. Thus, the UE 315 and the TRP 305 may reduce signaling and network overhead (e.g., related to beam indication) by using a single TCI state, which may be referred to as a joint downlink and uplink TCI state, to indicate QCL rules for communication in both the downlink and uplink direction.

In some examples, the joint downlink and uplink TCI state may indicate one or more QCL rules to provide properties of one or more common beams 330, where one or more TRPs 305 and the UE 315 use each common beam 330 for downlink and uplink. The UE 315 may use the joint downlink and uplink TCI state to communicate in both the downlink and uplink directions across the one or more TRPs 305, multiple component carriers 335, or both using a common beam 330. For example, UE 315 may support carrier aggregation or multi-carrier operation in which a base station 105 or a TRP 305 configures UE 315 with multiple downlink component carriers 335 and one or more uplink component carriers 335 according to a carrier aggregation configuration and across the one or more TRPs (e.g., TRP 305-*a* through TRP 305-*c*). The UE 315 may activate the joint downlink and uplink TCI state for one or more supported component carriers 335 across the one or more TRPs 305 that share a common beam 330 (e.g., based on receiving control signaling that indicates the component carriers 335). For example, the UE 315 may apply the joint downlink and uplink TCI state to each component carrier 335, to each BWP of each component carrier 335, or both to activate the component carriers 335. However, there may not be a method for the UE 315 to schedule communications across multiple component carriers 335, multiple TRPs 305, or both based on the joint downlink and uplink TCI state.

In some cases, a UE 315 may receive scheduling information 320 from a TRP 305 that indicates one or more uplink resources and one or more downlink resources for communications between the UE 315 and one or more TRPs 305 (e.g., including the TRP 305). For example, UE 315 may receive an indication of scheduling information 320 from TRP 305-*a* in a DCI message, a MAC-CE, or the like on component carrier 335-*a*. In some examples, the scheduling information 320 may include an indication of a joint downlink and uplink TCI state identifier. In some other examples, the scheduling information 320 may include an SRI field, which may include an indication of a common beam 330 across component carriers 335. In some cases, the UE 315 may use the information in the SRI field to map to the joint downlink and uplink TCI state for the common beam 330. In some examples, the common beam 330 may be common for both transmitting an uplink transmission and receiving a downlink transmission at the UE 315, the TRPs 305, or both.

In some cases, UE 315 may schedule communications 325 across multiple component carriers 335, such as communications 325-*a* through communications 325-*c* across component carrier 335-*a* through component carrier 335-*c*, respectively, based on the scheduling information 320, which is described in further detail with respect to FIG. 4. For example, UE 315 may schedule communications with TRP 305-*a* using component carrier 335-*a*, TRP 305-*b* using component carrier 335-*b*, and TRP 305-*c* using component carrier 335-*c* based on one or more TRP identifiers in the control signaling. In some cases, UE 315 may receive a downlink transmission from TRP 305-*a* through TRP 305-*c* using one or more downlink resources included in the scheduling information 320. Additionally, UE 315 may transmit an uplink transmission to TRP 305-*a* through TRP 305-*c* using one or more uplink resources included in the scheduling information 320. UE 315 may receive the downlink transmission and may transmit the uplink transmission using component carrier 335-*a*, component carrier 335-*b*, component carrier 335-*c*, or a combination, on a common beam 330 (e.g., based on applying a joint downlink and uplink TCI state to the component carriers 335).

FIG. 4 illustrates an example of a transmission diagram that supports techniques for cross-component carrier scheduling of a joint downlink and uplink TCI state in accordance with aspects of the present disclosure. In some examples, transmission diagram 400 may implement aspects of wireless communication system 100, wireless communications system 200, wireless communications system 300, or a combination. For example, transmission diagram 400 may be implemented by a UE 115, a UE 215, a UE 315, a base station 105, a base station 205, or one or more TRPs 305 as described with reference to FIGS. 1, 2, and 3. In some cases, a base station or a TRP may transmit control signaling to a UE including scheduling information 405 for communications 410 in both the downlink and uplink direction for a common beam 415 across multiple component carriers 420, multiple TRPs, or both. In some examples, the common beam 415 may be common for one or more downlink channels and one or more uplink channels across the multiple component carriers 420.

In some examples, a UE may receive control signaling, such as a DCI message, including scheduling information 405. The scheduling information 405 may include an indication of a joint downlink and uplink TCI state identifier for a common beam 415, an SRI field indicating the common beam 415 or mapping to the joint downlink and uplink TCI state, or both. Additionally or alternatively, the scheduling information 405 may include an indication of the common beam 415, one or more TRP identifiers, or both. The UE may apply the joint downlink and uplink TCI state at the component carriers 420 to activate the common beam 415 to transmit one or more uplink transmissions or to receive one or more downlink transmissions at the UE. For example, the UE may activate component carrier 420-*a* for communications 410-*a*, component carrier 420-*b* for communications 410-*b*, component carrier 420-*c* for communications 410-*c*, or a combination using the common beam 415. In some examples, a base station or a TRP may transmit an indication of a list of component carriers 420 that support a joint downlink and uplink TCI state to the UE (e.g., in control signaling, such as RRC signaling). The UE may receive additional control signaling, such as dynamic control signaling (e.g., a DCI message), that indicates which component carriers 420 to activate.

In some cases, the UE may schedule communications 410-*a* through communication 410-*c* based on the scheduling information 405. For example, the UE may communicate with a base station, one or more TRPs, or both across the component carriers 420 and using the common beam 415. The communications 410 may include transmitting at least one uplink transmission during one or more uplink resources indicated in the scheduling information 405 and receiving at least one downlink transmission during one or more downlink resources indicated in the scheduling information 405.

Figure 5:
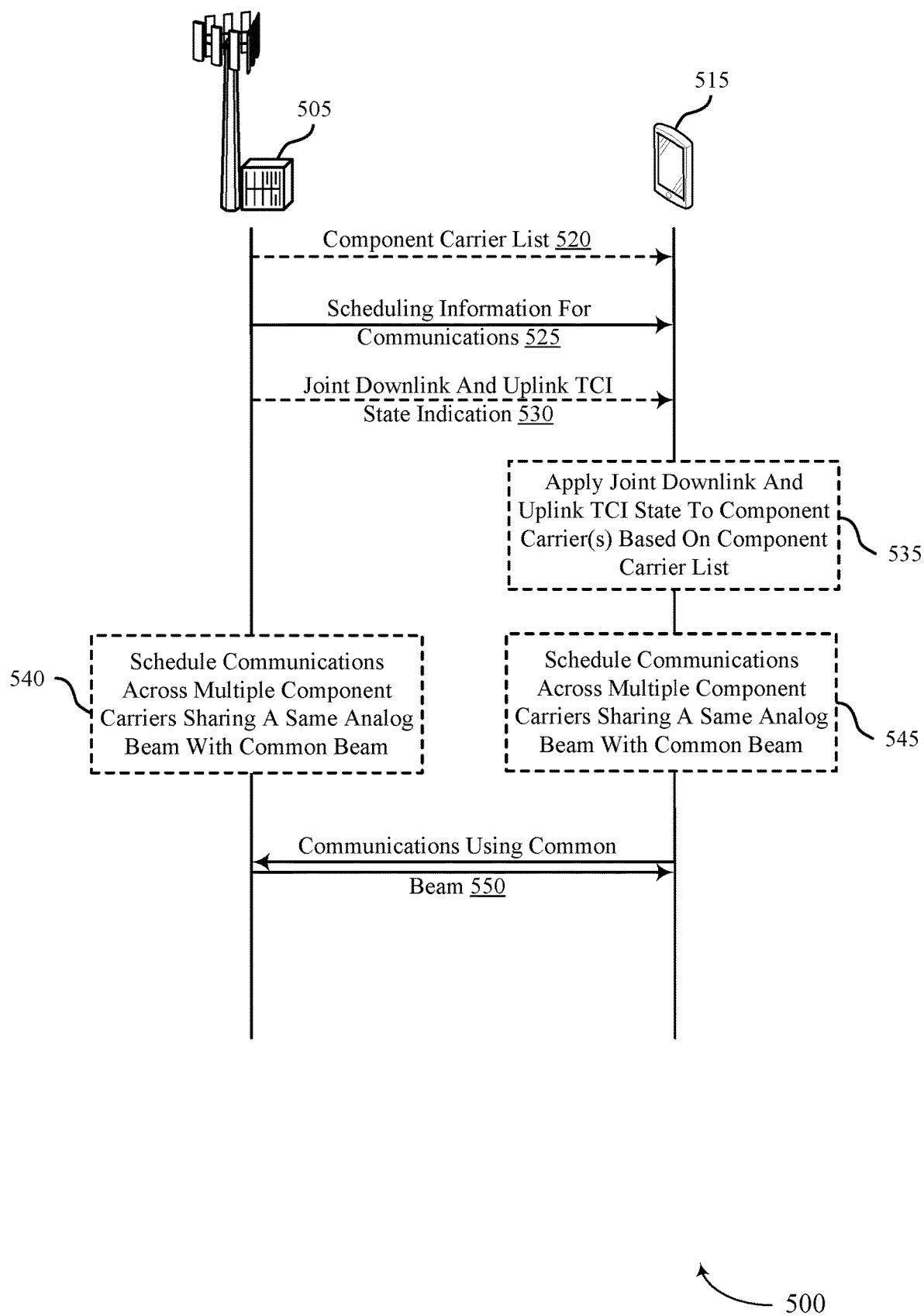
FIGS. 5 and 6 illustrate examples of process flows that support techniques for cross-component carrier scheduling of a joint downlink and uplink TCI state in accordance with aspects of the present disclosure.

FIG. 5 illustrates an example of a process flow that supports techniques for cross-component carrier scheduling of a joint downlink and uplink TCI state in accordance with aspects of the present disclosure. In some examples, process flow 500 may implement aspects of wireless communications system 100 through wireless communications system 300, transmission diagram 400, or a combination. The process flow 500 may illustrate an example of a base station 505 transmitting control signaling including scheduling information to a UE 515. The scheduling information may be for communications between the base station 505 and the UE 515 in both the downlink and uplink direction for a common beam across multiple component carriers. Alternative examples of the following may be implemented, where some processes are performed in a different order than described or are not performed. In some cases, processes may include additional features not mentioned below, or further processes may be added.

At 520, the UE 515 may receive an indication of a component carrier list (e.g., via RRC signaling). In some cases, the component carrier list may be based on one or more component carriers that share a same analog beam. In some other cases, the component carrier list may be based on the one or more component carriers supporting a joint downlink and uplink TCI state, the one or more component carriers capability for using the joint downlink and uplink TCI state for uplink communication and for downlink communication.

At 525, the base station 505 may transmit scheduling information to the UE 515. For example, the base station 505 may transmit control signaling, such as a DCI message, a MAC-CE, or the like, including the scheduling information, which the UE 515 may use to schedule communications between the base station 505 and the UE 515. The scheduling information may be for one or more downlink resources and one or more uplink resources across multiple component carriers and may be based on a joint downlink and uplink TCI state. For example, the UE 515 may determine the component carriers support the joint downlink and uplink TCI state based on the component carrier list received at 520. The control signaling may include an indication (e.g., a dynamic indication in the DCI message) of the component carriers on which to schedule communications.

At 530, the UE 515 may receive an indication of the joint downlink and uplink TCI state from the base station 505. For example, the UE 515 may receive an indication in a field of the control signaling (e.g., a field in a DCI message) that includes a joint downlink and uplink TCI state identifier for the joint downlink and uplink TCI state. In some other examples, UE 515 may receive a field in an SRI that indicates a common beam or maps to the joint downlink and uplink TCI state. At 535, the UE 515 may apply the joint downlink and uplink TCI state to the component carriers based on the component carrier list received at 520. In some cases, the UE 515 may receive dynamic control signaling (e.g., a DCI message, a MAC-CE, or the like) that indicates the component carriers to schedule from the component carrier list.

At 540 and 545, the base station 505 and the UE 515 may schedule a downlink transmission and an uplink transmission across the multiple component carriers. In some cases, the multiple component carriers may share a same analog beam with a common beam for the joint downlink and uplink TCI state. In some cases, the UE 515 may receive an indication of the common beam from a component carrier (e.g., CC1). The common beam may be common for one or more downlink channels and one or more uplink channels across the multiple component carriers.

At 550, the UE 515 and the base station 505 may communicate using the common beam for the joint downlink and uplink TCI state. For example, the UE 515 may receive a downlink transmission from the base station 505 using the one or more downlink resources and may transmit an uplink transmission to the base station 505 using the one or more uplink resources indicated in the scheduling information at 525.

Figure 6:
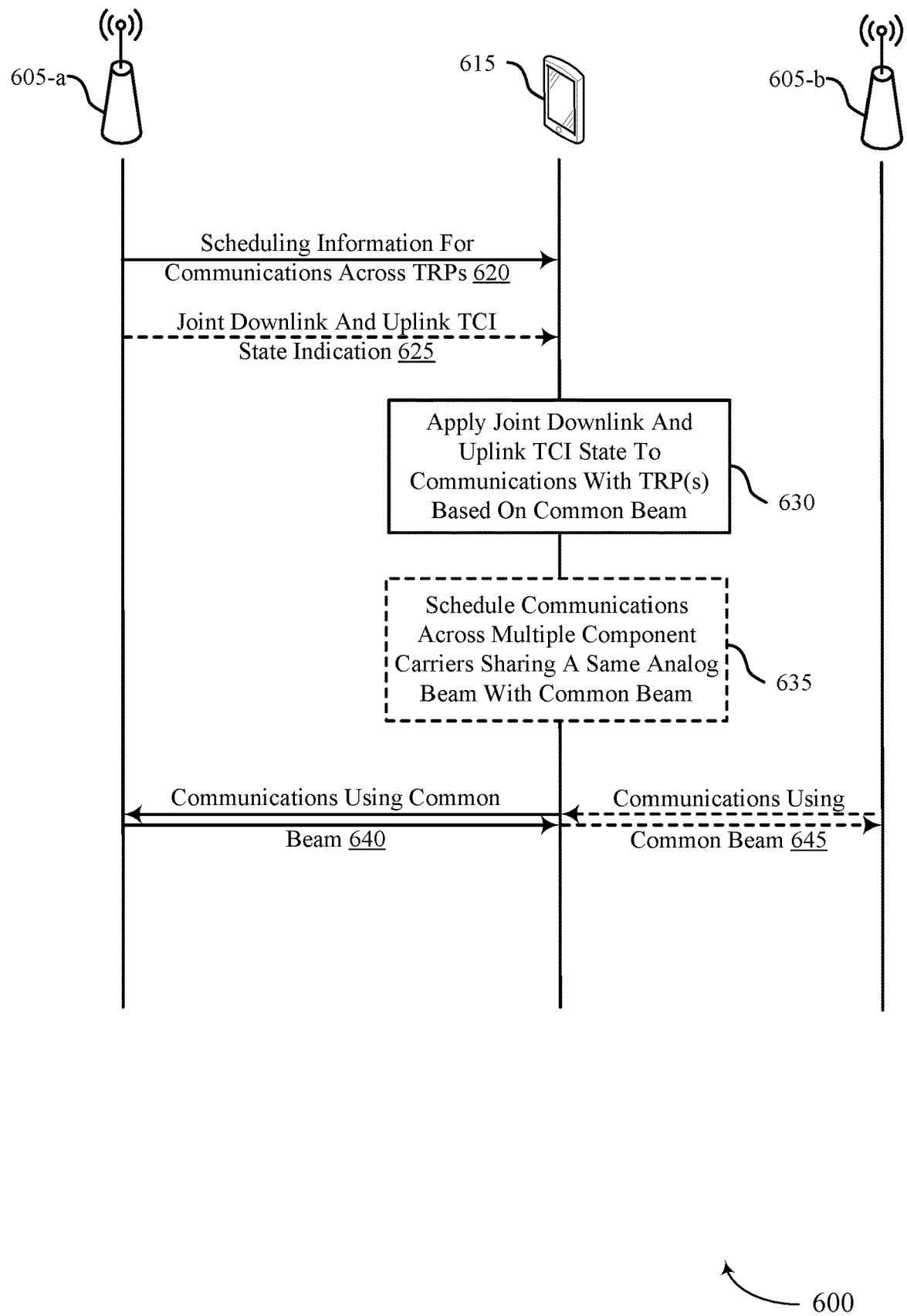

FIG. 6 illustrates an example of a process flow that supports techniques for cross-component carrier scheduling of a joint downlink and uplink TCI state in accordance with aspects of the present disclosure. In some examples, process flow 600 may implement aspects of wireless communications system 100 through wireless communications system 300, transmission diagram 400, or a combination. The process flow 600 may illustrate an example of a TRP 605, such as TRP 605-a, transmitting control signaling including scheduling information to a UE 615. The scheduling information may be for communications between one or more TRPs 605 and the UE 615 in both the downlink and uplink direction for a common beam across multiple component carriers. Alternative examples of the following may be implemented, where some processes are performed in a different order than described or are not performed. In some cases, processes may include additional features not mentioned below, or further processes may be added.

At 620, TRP 605-a may transmit scheduling information to the UE 615. For example, TRP 605-a may transmit control signaling, such as a DCI message, a MAC-CE, or the like, including the scheduling information, which the UE 615 may use to schedule communications between TRP 605-a and the UE 615, TRP 605-b and UE 615, or both. The scheduling information may be for one or more downlink resources and one or more uplink resources across multiple component carriers, multiple TRPs 605, or both and may be based on a joint downlink and uplink TCI state. For example, the UE 615 may determine the component carriers support the joint downlink and uplink TCI state based on a component carrier list (e.g., received in control signaling, such as RRC signaling). The control signaling may include an indication (e.g., a dynamic indication in the DCI message) of the component carriers on which to schedule communications.

At 625, the UE 615 may receive an indication of the joint downlink and uplink TCI state from TRP 605-a. For example, the UE 615 may receive an indication in a field of the control signaling (e.g., a field in a DCI message) that includes a joint downlink and uplink TCI state identifier for the joint downlink and uplink TCI state. In some other examples, the UE 615 may receive a field in an SRI that indicates a common beam or maps to the joint downlink and uplink TCI state. At 630, the UE 615 may apply the joint downlink and uplink TCI state to the component carriers based on a component carrier list, an indication of multiple component carriers, or both. For example, the UE 615 may receive dynamic control signaling (e.g., a DCI message, a MAC-CE, or the like) that indicates the component carriers to schedule from the component carrier list.

At 635, the UE 615 may schedule a downlink transmission and an uplink transmission across the multiple component carriers, multiple TRPs 605 (e.g., TRP 605-a, TRP 605-b, or both), or both. In some cases, the multiple component carriers may share a same analog beam with a common beam for the joint downlink and uplink TCI state. In some cases, the UE 615 may receive an indication of the common beam from a component carrier (e.g., CC1). The common beam may be common for one or more downlink channels and one or more uplink channels across the multiple component carriers and the TRPs 605.

At 640 and 645, the UE 615 and TRP 605-a, UE 615 and TRP 605-b, or both may communicate using the common beam for the joint downlink and uplink TCI state. For example, the UE 615 may receive a downlink transmission from TRP 605-*a* using the one or more downlink resources and may transmit an uplink transmission to TRP 605-*a* using the one or more uplink resources indicated in the scheduling information at 620. Similarly, the UE 615 may receive a downlink transmission from TRP 605-*b* using the one or more downlink resources and may transmit an uplink transmission to TRP 605-*b* using the one or more uplink resources indicated in the scheduling information at 620.

Figure 7:
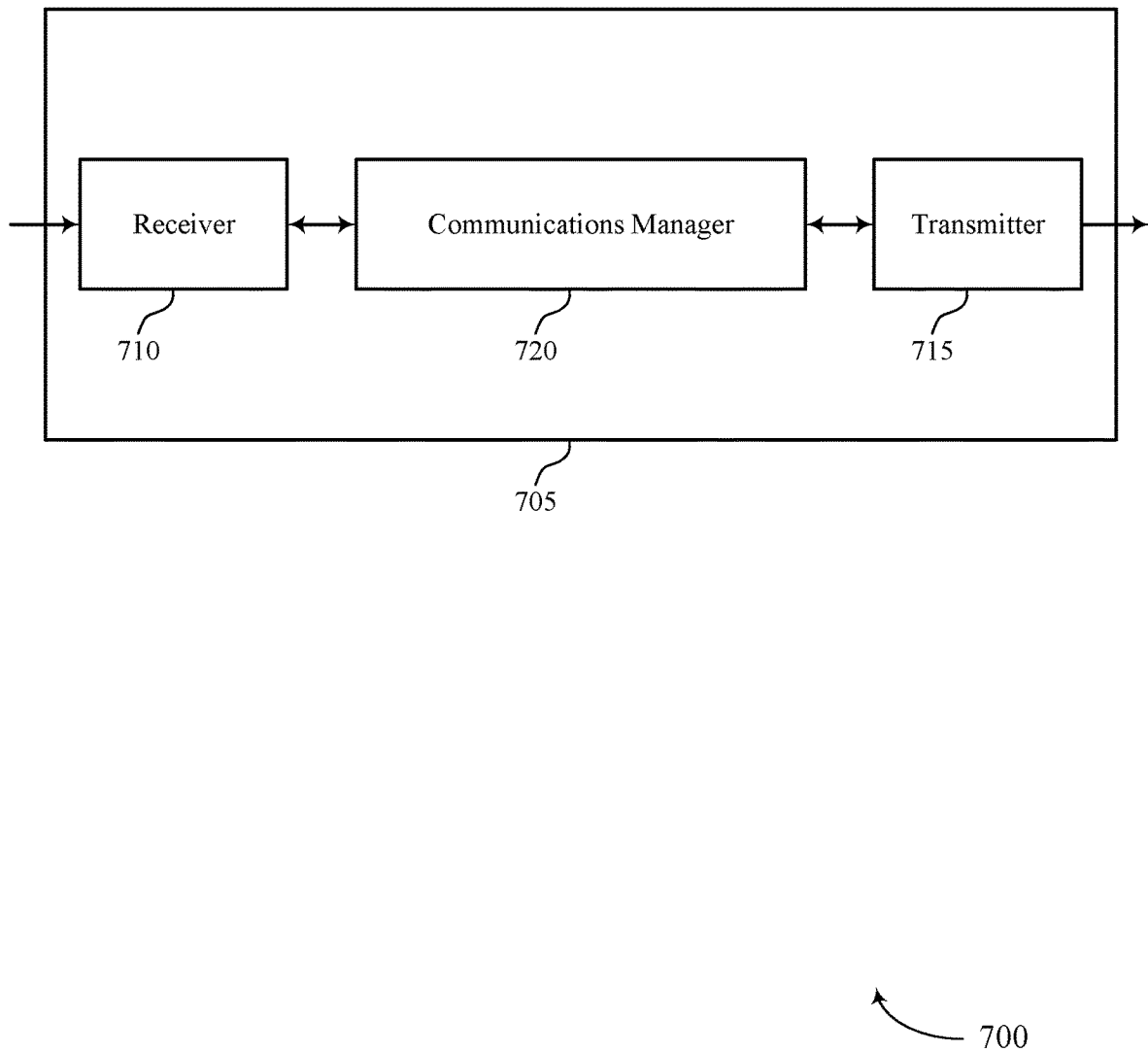
FIGS. 7 and 8 show block diagrams of devices that support techniques for cross-component carrier scheduling of a joint downlink and uplink TCI state in accordance with aspects of the present disclosure.

FIG. 7 shows a block diagram of a device that supports techniques for cross-component carrier scheduling of a joint downlink and uplink TCI state in accordance with aspects of the present disclosure. The block diagram 700 may include device 705, which may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for cross-component carrier scheduling of a joint downlink and uplink TCI state). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for cross-component carrier scheduling of a joint downlink and uplink TCI state). In some examples, the transmitter 715 may be co-located with a receiver 710 in a transceiver component. The transmitter 715 may utilize a single antenna or a set of multiple antennas.

The communications manager 720, the receiver 710, the transmitter 715, or various combinations thereof or various components thereof may be examples of means for performing various aspects of techniques for cross-component carrier scheduling of a joint downlink and uplink TCI state as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. For example, the communications manager 720 may be configured as or otherwise support a means for receiving control signaling including scheduling information for one or more downlink resources and one or more uplink resources across a set of multiple component carriers based on a joint downlink and uplink TCI state, where the joint downlink and uplink TCI state is associated with one or more of the set of multiple component carriers based on a component carrier list. The communications manager 720 may be configured as or otherwise support a means for communicating with a base station based on a common beam corresponding to the joint downlink and uplink TCI state.

Additionally or alternatively, the communications manager 720 may support wireless communications at a UE in accordance with examples as disclosed herein. For example, the communications manager 720 may be configured as or otherwise support a means for receiving control signaling including scheduling information for one or more downlink resources and one or more uplink resources associated with a common beam across a set of multiple TRPs. The communications manager 720 may be configured as or otherwise support a means for communicating with one or more TRPs of the set of multiple TRPs across a set of multiple component carriers based on the common beam, where a joint downlink and uplink TCI state is associated with the communications with the one or more TRPs.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for receiving control signaling at the UE that indicates scheduling information for communications across multiple component carriers, multiple TRPs, or both using a common beam for a joint downlink and uplink TCI state, which may reduce processing power and may provide for more efficient utilization of communication resources.

Figure 8:
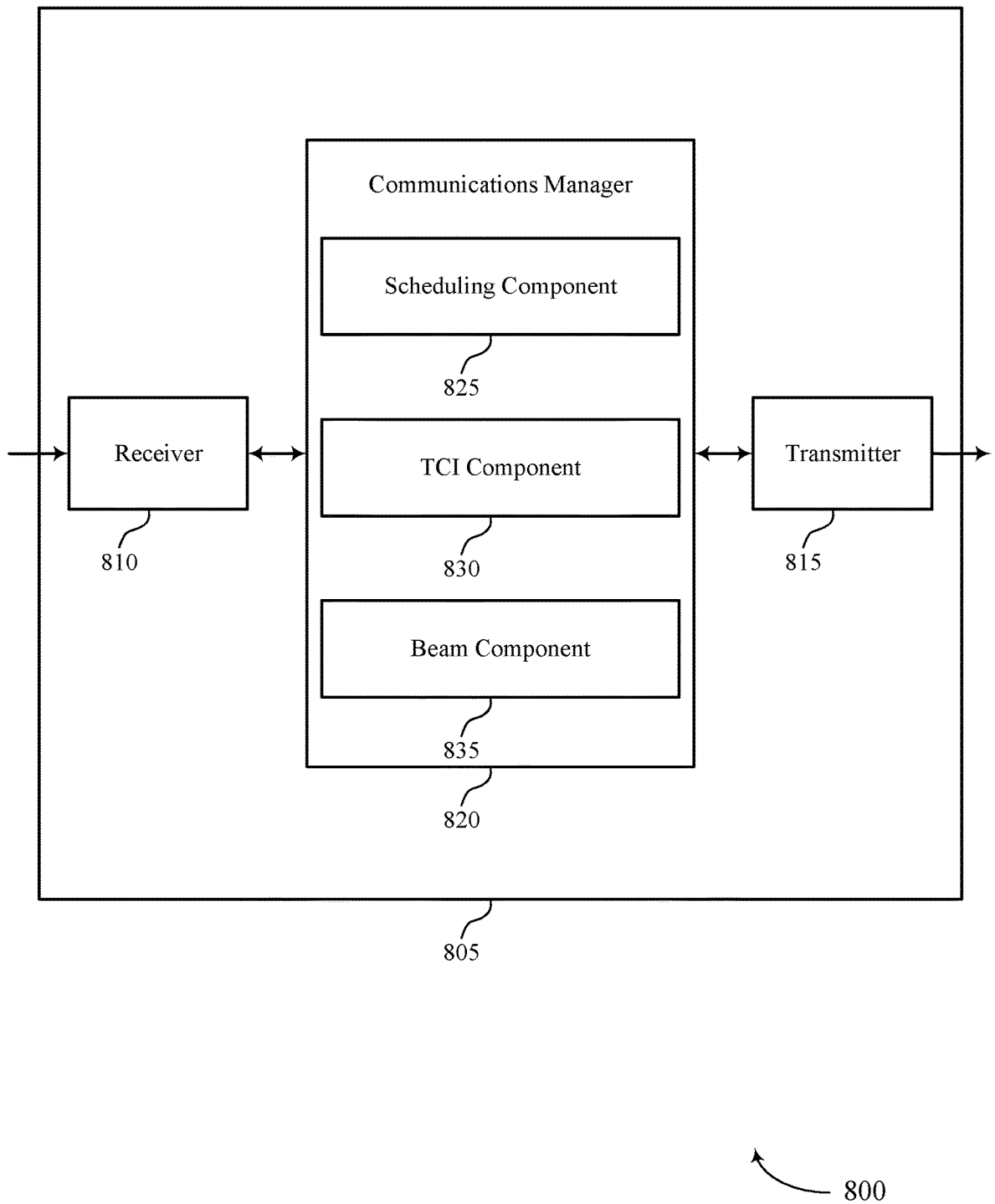

FIG. 8 shows a block diagram of a device that supports techniques for cross-component carrier scheduling of a joint downlink and uplink TCI state in accordance with aspects of the present disclosure. Block diagram 800 may include device 805, which may be an example of aspects of a device 705 or a UE 115, a UE 215, a UE 315, a UE 515, or a UE 615 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for cross-component carrier scheduling of a joint downlink and uplink TCI state). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for cross-component carrier scheduling of a joint downlink and uplink TCI state). In some examples, the transmitter 815 may be co-located with a receiver 810 in a transceiver component. The transmitter 815 may utilize a single antenna or a set of multiple antennas.

The device 805, or various components thereof, may be an example of means for performing various aspects of techniques for cross-component carrier scheduling of a joint downlink and uplink TCI state as described herein. For example, the communications manager 820 may include a scheduling component 825, a TCI component 830, a beam component 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. The scheduling component 825 may be configured as or otherwise support a means for receiving control signaling including scheduling information for one or more downlink resources and one or more uplink resources across a set of multiple component carriers based on a joint downlink and uplink TCI state, where the joint downlink and uplink TCI state is associated with one or more of the set of multiple component carriers based on a component carrier list. The TCI component 830 may be configured as or otherwise support a means for communicating with a base station based on a common beam corresponding to the joint downlink and uplink TCI state.

Additionally or alternatively, the communications manager 820 may support wireless communications at a UE in accordance with examples as disclosed herein. The scheduling component 825 may be configured as or otherwise support a means for receiving control signaling including scheduling information for one or more downlink resources and one or more uplink resources associated with a common beam across a set of multiple TRPs. The beam component 835 may be configured as or otherwise support a means for communicating with one or more TRPs of the set of multiple TRPs across a set of multiple component carriers based on the common beam, where a joint downlink and uplink TCI state is associated with the communications with the one or more TRPs.

Figure 9:
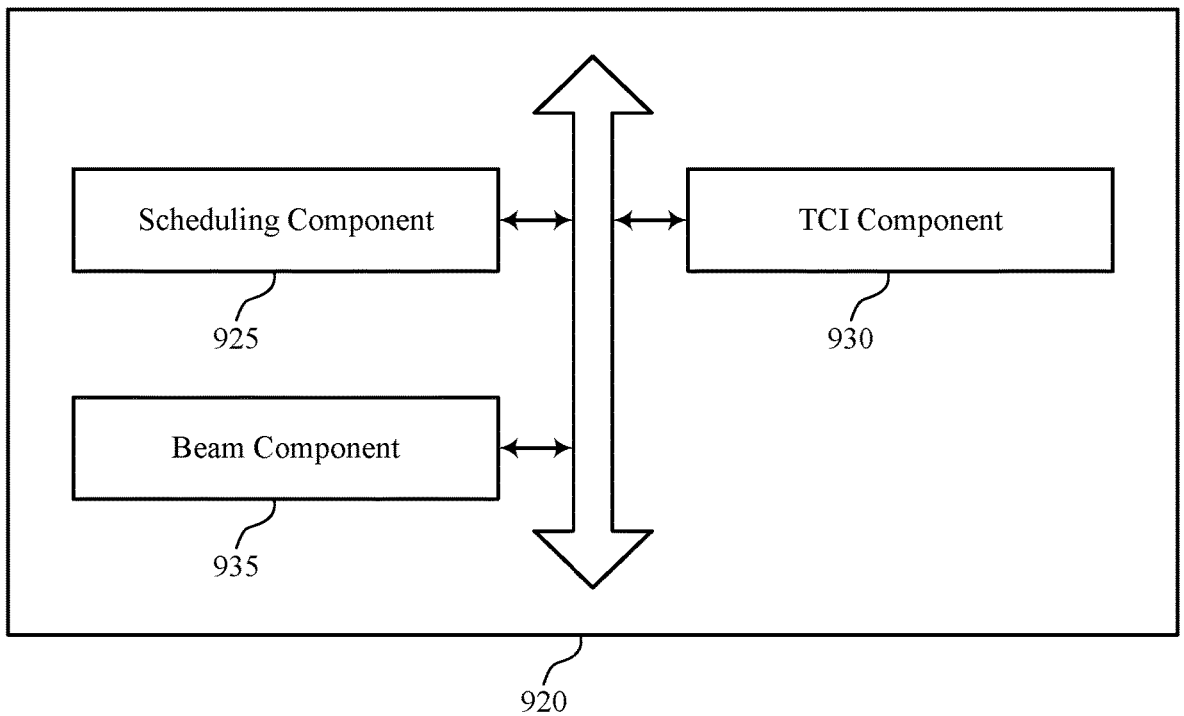
FIG. 9 shows a block diagram of a communications manager that supports techniques for cross-component carrier scheduling of a joint downlink and uplink TCI state in accordance with aspects of the present disclosure.

FIG. 9 shows a block diagram of a communications manager that supports techniques for cross-component carrier scheduling of a joint downlink and uplink TCI state in accordance with aspects of the present disclosure. The block diagram 900 may include communications manager 920, which may be an example of aspects of a communications manager 720, a communications manager 820, or both, as described herein. The communications manager 920, or various components thereof, may be an example of means for performing various aspects of techniques for cross-component carrier scheduling of a joint downlink and uplink TCI state as described herein. For example, the communications manager 920 may include a scheduling component 925, a TCI component 930, a beam component 935, or any combination thereof. Each of these components may communicate, directly or indirectly, with one another (e.g., via one or more buses).

The communications manager 920 may support wireless communications at a UE in accordance with examples as disclosed herein. The scheduling component 925 may be configured as or otherwise support a means for receiving control signaling including scheduling information for one or more downlink resources and one or more uplink resources across a set of multiple component carriers based on a joint downlink and uplink TCI state, where the joint downlink and uplink TCI state is associated with one or more of the set of multiple component carriers based on a component carrier list. The TCI component 930 may be configured as or otherwise support a means for communicating with a base station based on a common beam corresponding to the joint downlink and uplink TCI state.

In some examples, to support receiving the control signaling, the TCI component 930 may be configured as or otherwise support a means for receiving an indication of the joint downlink and uplink TCI state. In some examples, the indication is a field in the control signaling including a joint downlink and uplink TCI state identifier. In some examples, the indication includes a field in an SRI. The field may indicate a common beam or may provide a mapping to the joint downlink and uplink TCI state.

In some examples, to support communicating with the base station, the scheduling component 925 may be configured as or otherwise support a means for receiving a downlink transmission from the base station using the one or more downlink resources. In some examples, to support communicating with the base station, the scheduling component 925 may be configured as or otherwise support a means for transmitting an uplink transmission to the base station using the one or more uplink resources. In some examples, the scheduling component 925 may be configured as or otherwise support a means for scheduling the downlink transmission and the uplink transmission across the set of multiple component carriers based on the set of multiple component carriers sharing a same analog beam with the common beam corresponding to the joint downlink and uplink transmission configuration indictor state.

In some examples, the beam component 935 may be configured as or otherwise support a means for receiving, from a component carrier of the set of multiple component carriers, an indication of the common beam for one or more downlink channels and one or more uplink channels across the set of multiple component carriers.

In some examples, to support receiving the control signaling, the TCI component 930 may be configured as or otherwise support a means for receiving first control signaling including a first indication of the component carrier list, the component carrier list including the one or more of the set of multiple component carriers. In some examples, to support receiving the control signaling, the TCI component 930 may be configured as or otherwise support a means for receiving second control signaling including a second indication of the joint downlink and uplink TCI state. In some examples, the one or more of the set of multiple component carriers share a same analog beam. In some examples, the one or more of the set of multiple component carriers support the joint downlink and uplink TCI state. In some examples, the one or more of the set of multiple component carriers support a downlink TCI state or an uplink TCI state.

Additionally or alternatively, the communications manager 920 may support wireless communications at a UE in accordance with examples as disclosed herein. In some examples, the scheduling component 925 may be configured as or otherwise support a means for receiving control signaling including scheduling information for one or more downlink resources and one or more uplink resources associated with a common beam across a set of multiple TRPs. The beam component 935 may be configured as or otherwise support a means for communicating with one or more TRPs of the set of multiple TRPs across a set of multiple component carriers based on the common beam, where a joint downlink and uplink TCI state is associated with the communications with the one or more TRPs.

In some examples, to support receiving the control signaling, the TCI component 930 may be configured as or otherwise support a means for receiving an indication of the joint downlink and uplink TCI state and one or more TRP identifiers corresponding to the one or more TRPs. In some examples, to support receiving the control signaling, the scheduling component 925 may be configured as or otherwise support a means for scheduling the communications based on the indication. In some examples, the indication is a field in the control signaling including a joint downlink and uplink TCI state identifier and the one or more TRP identifiers. In some examples, the indication includes a field in an SRI. The field may indicate a common beam or may provide a mapping to the joint downlink and uplink TCI state.

In some examples, to support communicating with the one or more TRPs, the scheduling component 925 may be configured as or otherwise support a means for receiving a downlink transmission using the one or more downlink resources. In some examples, to support communicating with the one or more TRPs, the scheduling component 925 may be configured as or otherwise support a means for transmitting an uplink transmission using the one or more uplink resources.

Figure 10:
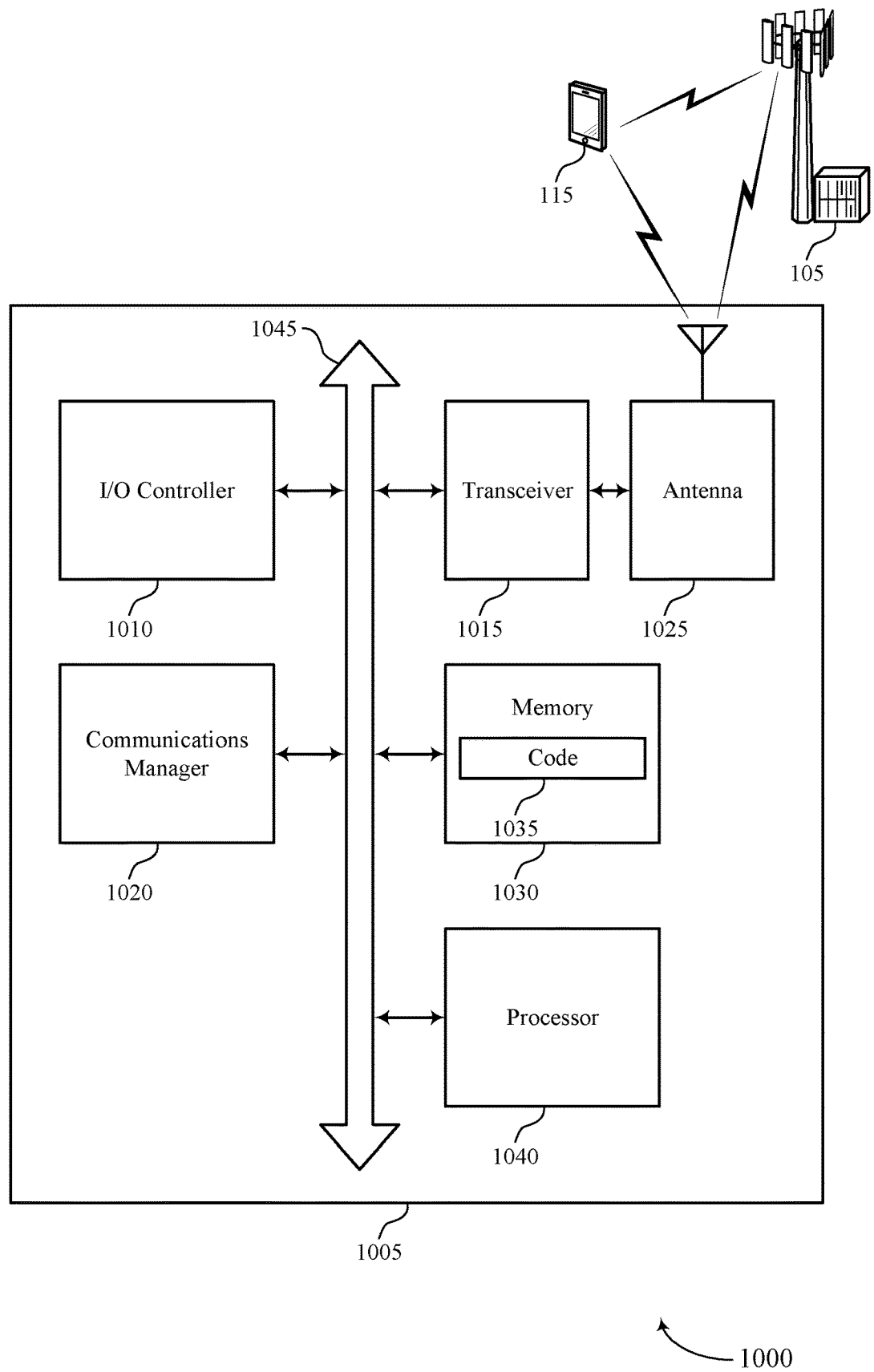
FIG. 10 shows a diagram of a system including a device that supports techniques for cross-component carrier scheduling of a joint downlink and uplink TCI state in accordance with aspects of the present disclosure.

FIG. 10 shows a diagram of a system including a device that supports techniques for cross-component carrier scheduling of a joint downlink and uplink TCI state in accordance with aspects of the present disclosure. System 1000 may include a device 1005, which may be an example of or include the components of a device 705, a device 805, or a UE 115, a UE 215, a UE 315, a UE 515, or a UE 615 as described herein. The device 1005 may communicate wirelessly with one or more base stations 105, base station 205, UEs 115, UEs 215, UEs 315, UEs 515, or UEs 615 or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for cross-component carrier scheduling of a joint downlink and uplink TCI state). For example, the device 1005 or a component of the device 1005 may include a processor 1040 and memory 1030 coupled to the processor 1040, the processor 1040 and memory 1030 configured to perform various functions described herein.

The communications manager 1020 may support wireless communications at a UE in accordance with examples as disclosed herein. For example, the communications manager 1020 may be configured as or otherwise support a means for receiving control signaling including scheduling information for one or more downlink resources and one or more uplink resources across a set of multiple component carriers based on a joint downlink and uplink TCI state, where the joint downlink and uplink TCI state is associated with one or more of the set of multiple component carriers based on a component carrier list. The communications manager 1020 may be configured as or otherwise support a means for communicating with a base station based on a common beam corresponding to the joint downlink and uplink TCI state.

Additionally or alternatively, the communications manager 1020 may support wireless communications at a UE in accordance with examples as disclosed herein. For example, the communications manager 1020 may be configured as or otherwise support a means for receiving control signaling including scheduling information for one or more downlink resources and one or more uplink resources associated with a common beam across a set of multiple TRPs. The communications manager 1020 may be configured as or otherwise support a means for communicating with one or more TRPs of the set of multiple TRPs across a set of multiple component carriers based on the common beam, where a joint downlink and uplink TCI state is associated with the communications with the one or more TRPs.

By including or configuring the communications manager 1020 in accordance with examples as described herein, the device 1005 may support techniques for scheduling communications in both the downlink and uplink direction across multiple component carriers, one or more TRPs, or both using a common beam for a joint downlink and uplink TCI sate, which may reduce latency as well as signaling and network overhead (e.g., related to beam indication).

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of techniques for cross-component carrier scheduling of a joint downlink and uplink TCI state as described herein, or the processor 1040 and the memory 1030 may be otherwise configured to perform or support such operations.

Figure 11:
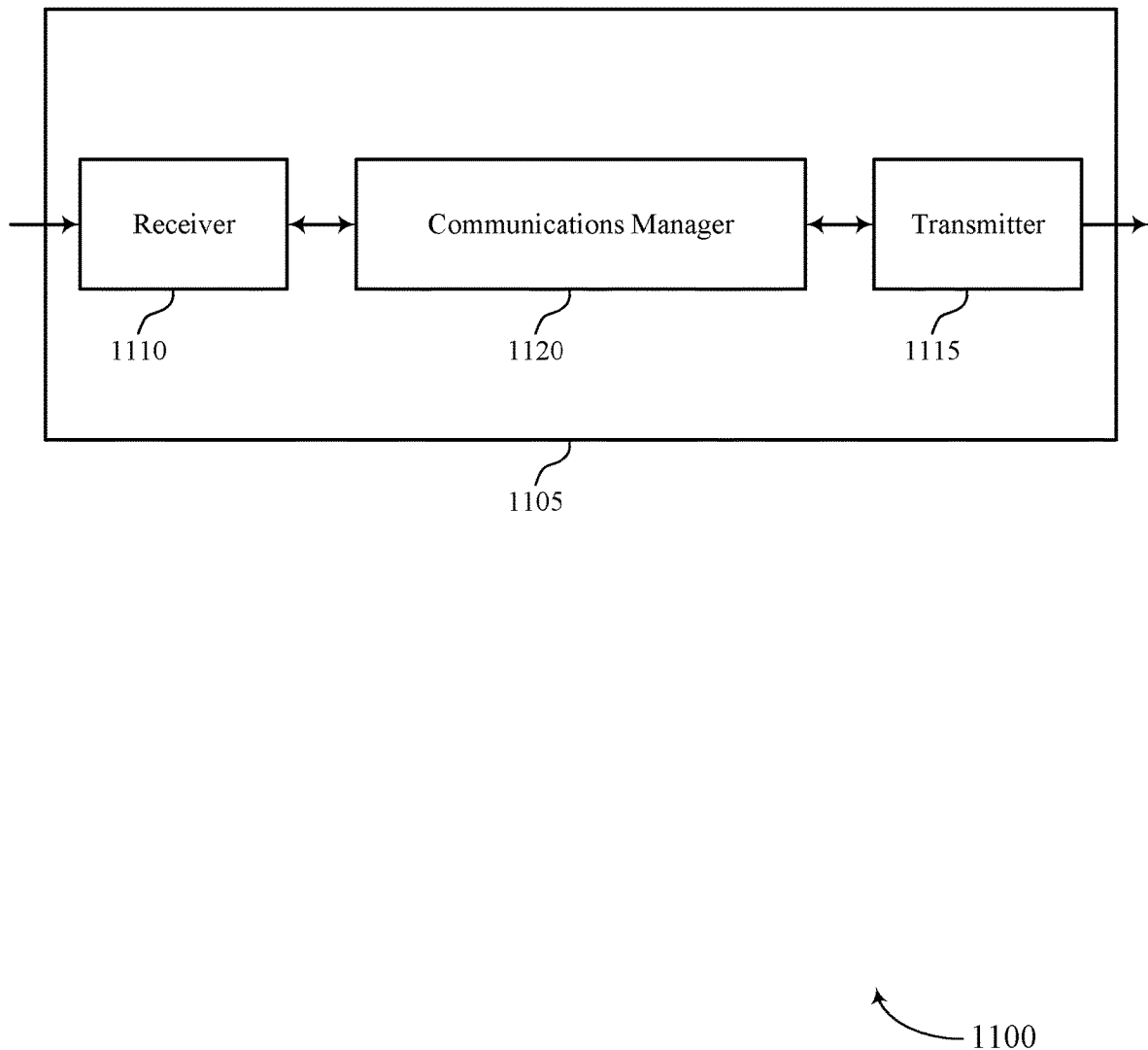
FIGS. 11 and 12 show block diagrams of devices that support techniques for cross-component carrier scheduling of a joint downlink and uplink TCI state in accordance with aspects of the present disclosure.

FIG. 11 shows a block diagram of a device that supports techniques for cross-component carrier scheduling of a joint downlink and uplink TCI state in accordance with aspects of the present disclosure. Block diagram 1100 may include a device 1105, which may be an example of aspects of a base station 105, a base station 205, a TRP 305, or a TRP 605, as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for cross-component carrier scheduling of a joint downlink and uplink TCI state). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for cross-component carrier scheduling of a joint downlink and uplink TCI state). In some examples, the transmitter 1115 may be co-located with a receiver 1110 in a transceiver component. The transmitter 1115 may utilize a single antenna or a set of multiple antennas.

The communications manager 1120, the receiver 1110, the transmitter 1115, or various combinations thereof or various components thereof may be examples of means for performing various aspects of techniques for cross-component carrier scheduling of a joint downlink and uplink TCI state as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a base station in accordance with examples as disclosed herein. For example, the communications manager 1120 may be configured as or otherwise support a means for transmitting, to a UE, control signaling including scheduling information for one or more downlink resources and one or more uplink resources across a set of multiple component carriers based on a joint downlink and uplink TCI state, where the joint downlink and uplink TCI state is associated with one or more of the set of multiple component carriers based on a component carrier list. The communications manager 1120 may be configured as or otherwise support a means for communicating with the UE based on a common beam corresponding to the joint downlink and uplink TCI state.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for transmitting control signaling to the UE that indicates scheduling information for communications across multiple component carriers, multiple TRPs, or both using a common beam for a joint downlink and uplink TCI state, which may reduce processing power and may provide for more efficient utilization of communication resources.

Figure 12:
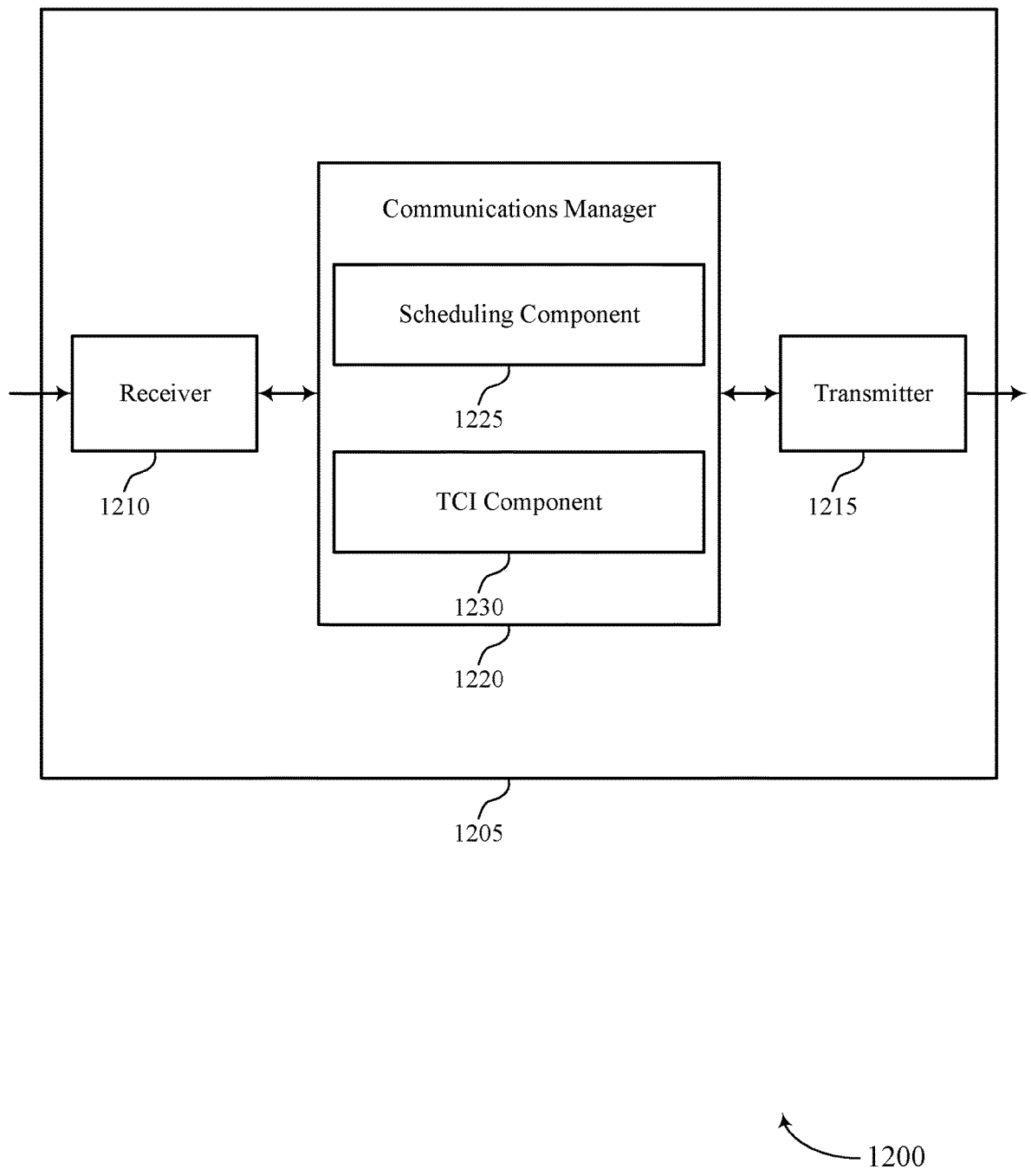

FIG. 12 shows a block diagram of a device that supports techniques for cross-component carrier scheduling of a joint downlink and uplink TCI state in accordance with aspects of the present disclosure. Block diagram 1200 may include a device 1205, which may be an example of aspects of a device 1105 or a base station 105, a base station 205, a TRP 305, or a TRP 605, as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to techniques for cross-component carrier scheduling of a joint downlink and uplink TCI state). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to techniques for cross-component carrier scheduling of a joint downlink and uplink TCI state). In some examples, the transmitter 1215 may be co-located with a receiver 1210 in a transceiver component. The transmitter 1215 may utilize a single antenna or a set of multiple antennas.

The device 1205, or various components thereof, may be an example of means for performing various aspects of techniques for cross-component carrier scheduling of a joint downlink and uplink TCI state as described herein. For example, the communications manager 1220 may include a scheduling component 1225 a TCI component 1230, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a base station in accordance with examples as disclosed herein. The scheduling component 1225 may be configured as or otherwise support a means for transmitting, to a UE, control signaling including scheduling information for one or more downlink resources and one or more uplink resources across a set of multiple component carriers based on a joint downlink and uplink TCI state, where the joint downlink and uplink TCI state is associated with one or more of the set of multiple component carriers based on a component carrier list. The TCI component 1230 may be configured as or otherwise support a means for communicating with the UE based on a common beam corresponding to the joint downlink and uplink TCI state.

Figure 13:
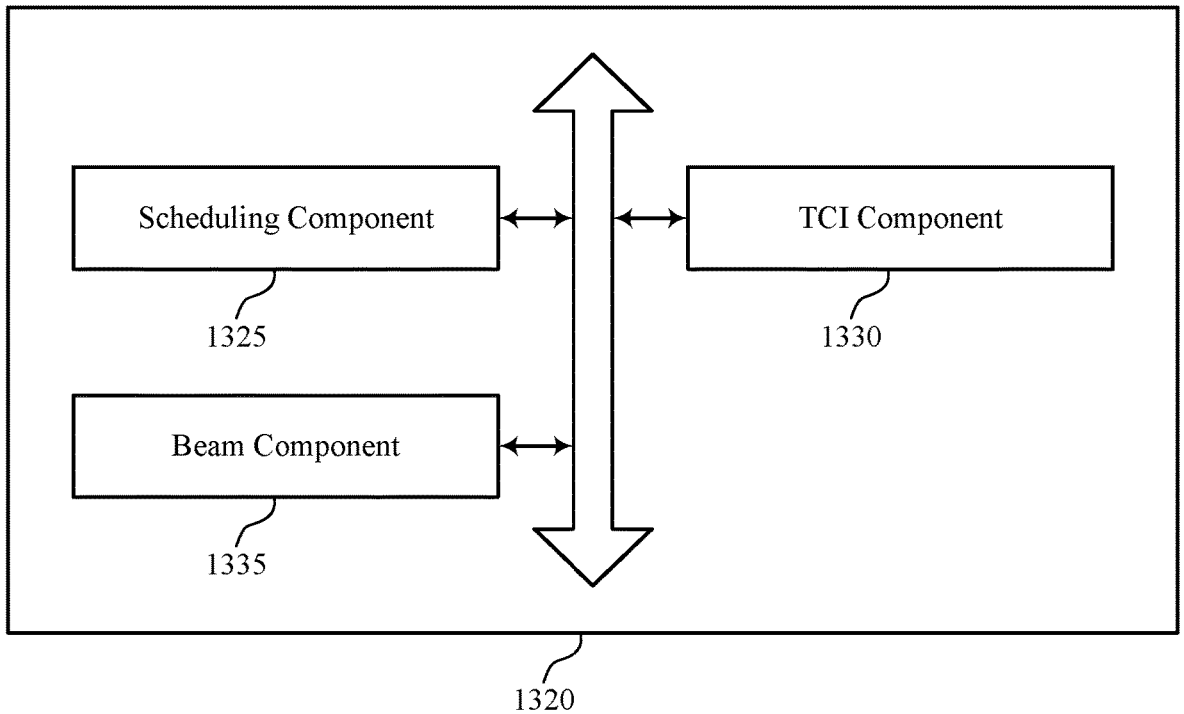
FIG. 13 shows a block diagram of a communications manager that supports techniques for cross-component carrier scheduling of a joint downlink and uplink TCI state in accordance with aspects of the present disclosure.

FIG. 13 shows a block diagram of a communications manager that supports techniques for cross-component carrier scheduling of a joint downlink and uplink TCI state in accordance with aspects of the present disclosure. Block diagram 1300 may include a communications manager 1320, which may be an example of aspects of a communications manager 1120, a communications manager 1220, or both, as described herein. The communications manager 1320, or various components thereof, may be an example of means for performing various aspects of techniques for cross-component carrier scheduling of a joint downlink and uplink TCI state as described herein. For example, the communications manager 1320 may include a scheduling component 1325, a TCI component 1330, a beam component 1335, or any combination thereof. Each of these components may communicate, directly or indirectly, with one another (e.g., via one or more buses).

The communications manager 1320 may support wireless communications at a base station in accordance with examples as disclosed herein. The scheduling component 1325 may be configured as or otherwise support a means for transmitting, to a UE, control signaling including scheduling information for one or more downlink resources and one or more uplink resources across a set of multiple component carriers based on a joint downlink and uplink TCI state, where the joint downlink and uplink TCI state is associated with one or more of the set of multiple component carriers based on a component carrier list. The TCI component 1330 may be configured as or otherwise support a means for communicating with the UE based on a common beam corresponding to the joint downlink and uplink TCI state.

In some examples, to support transmitting the control signaling, the TCI component 1330 may be configured as or otherwise support a means for transmitting an indication of the joint downlink and uplink TCI state. In some examples, the indication is a field in the control signaling including a joint downlink and uplink TCI state identifier. In some examples, the indication includes a field in an SRI. The field may indicate a common beam or may provide a mapping to the joint downlink and uplink TCI state.

In some examples, to support communicating with the UE, the scheduling component 1325 may be configured as or otherwise support a means for transmitting a downlink transmission to the UE using the one or more downlink resources. In some examples, to support communicating with the UE, the scheduling component 1325 may be configured as or otherwise support a means for receiving an uplink transmission from the UE using the one or more uplink resources.

In some examples, the scheduling component 1325 may be configured as or otherwise support a means for scheduling the downlink transmission and the uplink transmission across the set of multiple component carriers based on the set of multiple component carriers sharing a same analog beam with the common beam corresponding to the joint downlink and uplink transmission configuration indictor state.

In some examples, the beam component 1335 may be configured as or otherwise support a means for transmitting, from a component carrier of the set of multiple component carriers, an indication of the common beam for one or more downlink channels and one or more uplink channels across the set of multiple component carriers.

In some examples, to support transmitting the control signaling, the TCI component 1330 may be configured as or otherwise support a means for transmitting first control signaling including a first indication of the component carrier list, the component carrier list including the one or more of the set of multiple component carriers. In some examples, to support transmitting the control signaling, the TCI component 1330 may be configured as or otherwise support a means for transmitting second control signaling including a second indication of the joint downlink and uplink TCI state. In some examples, the one or more of the set of multiple component carriers share a same analog beam. In some examples, the one or more of the set of multiple component carriers support the joint downlink and uplink TCI state. In some examples, the one or more of the set of multiple component carriers support a downlink TCI state or an uplink TCI state.

Figure 14:
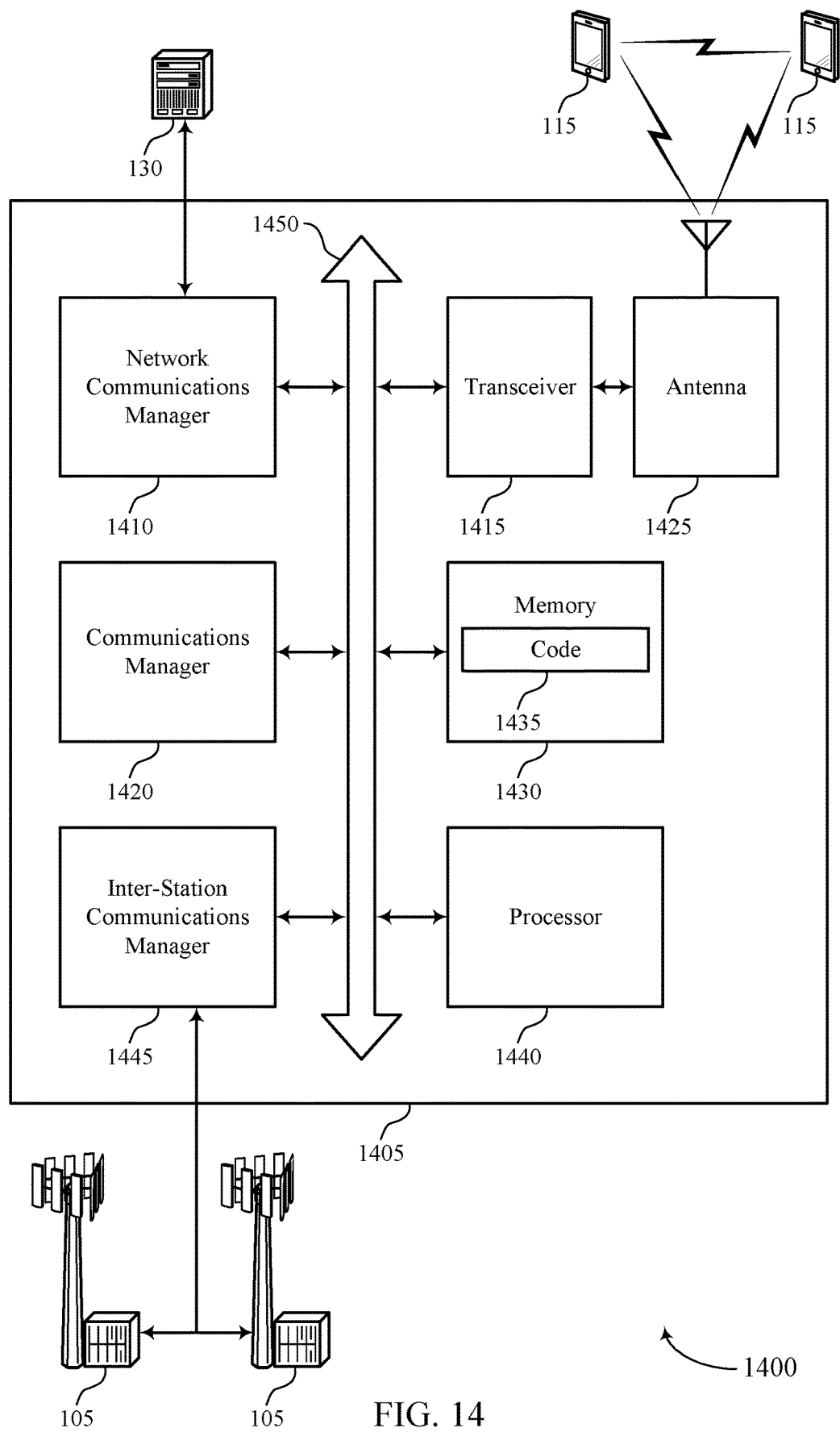
FIG. 14 shows a diagram of a system including a device that supports techniques for cross-component carrier scheduling of a joint downlink and uplink TCI state in accordance with aspects of the present disclosure.

FIG. 14 shows a diagram of a system including a device that supports techniques for cross-component carrier scheduling of a joint downlink and uplink TCI state in accordance with aspects of the present disclosure. System 1400 may include a device 1405, which may be an example of or include the components of a device 1105, a device 1205, or a base station 105, a base station 205, a TRP 305, or a TRP 605, as described herein. The device 1405 may communicate wirelessly with one or more base stations 105, base stations 205, UEs 115, UEs 215, UEs 315, UEs 515, UEs 615, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115, UEs 215, UEs 315, UEs 515, or UEs 615.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting techniques for cross-component carrier scheduling of a joint downlink and uplink TCI state). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105 or base stations 205, and may include a controller or scheduler for controlling communications with UEs 115, UEs 215, UEs 315, UEs 515, or UEs 615 in cooperation with other base stations 105 or base stations 205. For example, the inter-station communications manager 1445 may coordinate scheduling for transmissions to UEs 115, UEs 215, UEs 315, UEs 515, or UEs 615 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communications at a base station in accordance with examples as disclosed herein. For example, the communications manager 1420 may be configured as or otherwise support a means for transmitting, to a UE, control signaling including scheduling information for one or more downlink resources and one or more uplink resources across a set of multiple component carriers based on a joint downlink and uplink TCI state, where the joint downlink and uplink TCI state is associated with one or more of the set of multiple component carriers based on a component carrier list. The communications manager 1420 may be configured as or otherwise support a means for communicating with the UE based on a common beam corresponding to the joint downlink and uplink TCI state.

By including or configuring the communications manager 1420 in accordance with examples as disclosed herein, the device 1405 may support techniques for scheduling communications in both the downlink and uplink direction across multiple component carriers, one or more TRPs, or both using a common beam for a joint downlink and uplink TCI sate, which may reduce latency as well as signaling and network overhead (e.g., related to beam indication).

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of techniques for cross-component carrier scheduling of a joint downlink and uplink TCI state as described herein, or the processor 1440 and the memory 1430 may be otherwise configured to perform or support such operations.

Figure 15:
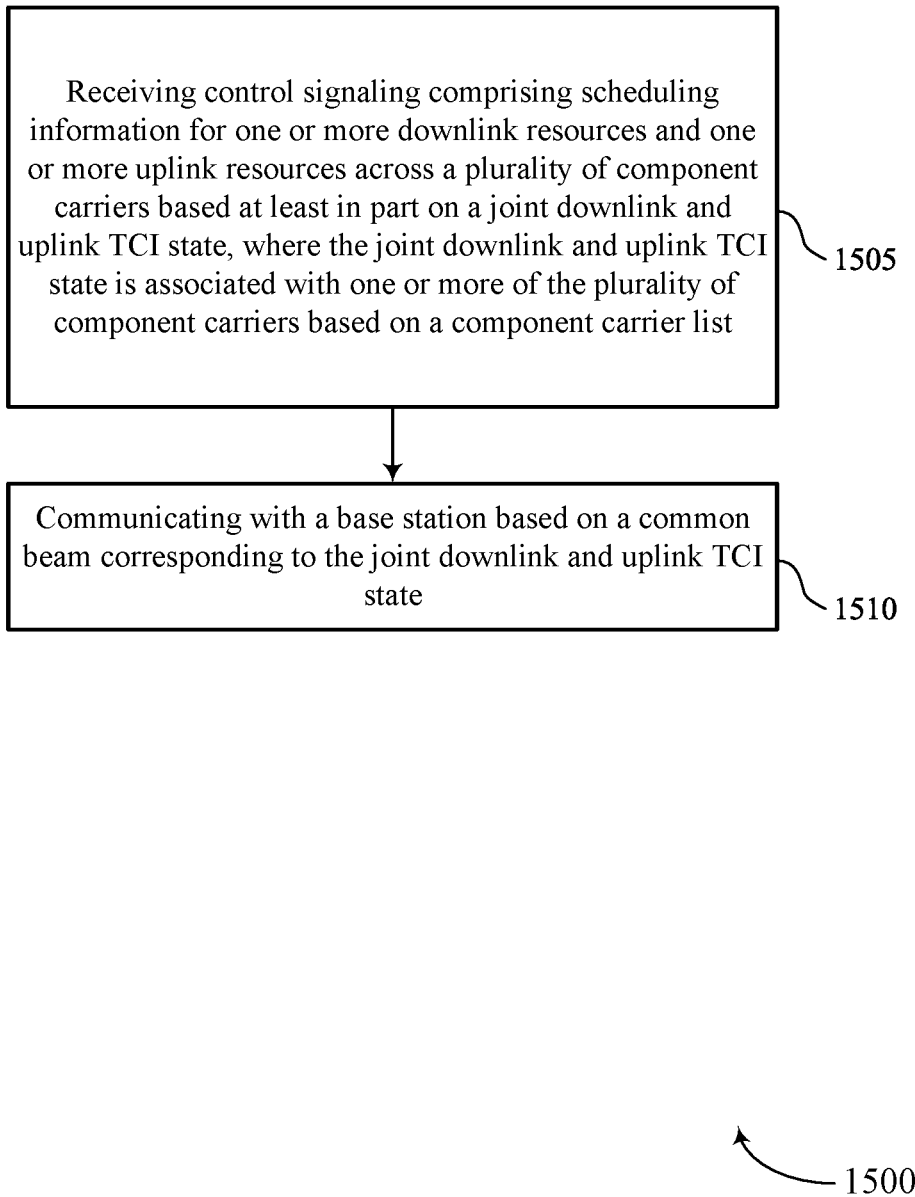
FIGS. 15 through 20 show flowcharts illustrating methods that support techniques for cross-component carrier scheduling of a joint downlink and uplink TCI state in accordance with aspects of the present disclosure.

FIG. 15 shows a flowchart illustrating a method that supports techniques for cross-component carrier scheduling of a joint downlink and uplink TCI state in accordance with aspects of the present disclosure. The operations of a method 1500 may be implemented by a UE or its components as described herein. For example, the operations of the method 1500 may be performed by a UE 115, a UE 215, a UE 315, a UE 515, or a UE 615 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving control signaling including scheduling information for one or more downlink resources and one or more uplink resources across a set of multiple component carriers based on a joint downlink and uplink TCI state, where the joint downlink and uplink TCI state is associated with one or more of the set of multiple component carriers based on a component carrier list. The operations of 1505 may be performed in accordance with examples as disclosed herein. In some examples, aspects of the operations of 1505 may be performed by a scheduling component 925 as described with reference to FIG. 9.

At 1510, the method may include communicating with a base station based on a common beam corresponding to the joint downlink and uplink TCI state. The operations of 1510 may be performed in accordance with examples as disclosed herein. In some examples, aspects of the operations of 1510 may be performed by a TCI component 930 as described with reference to FIG. 9.

Figure 16:
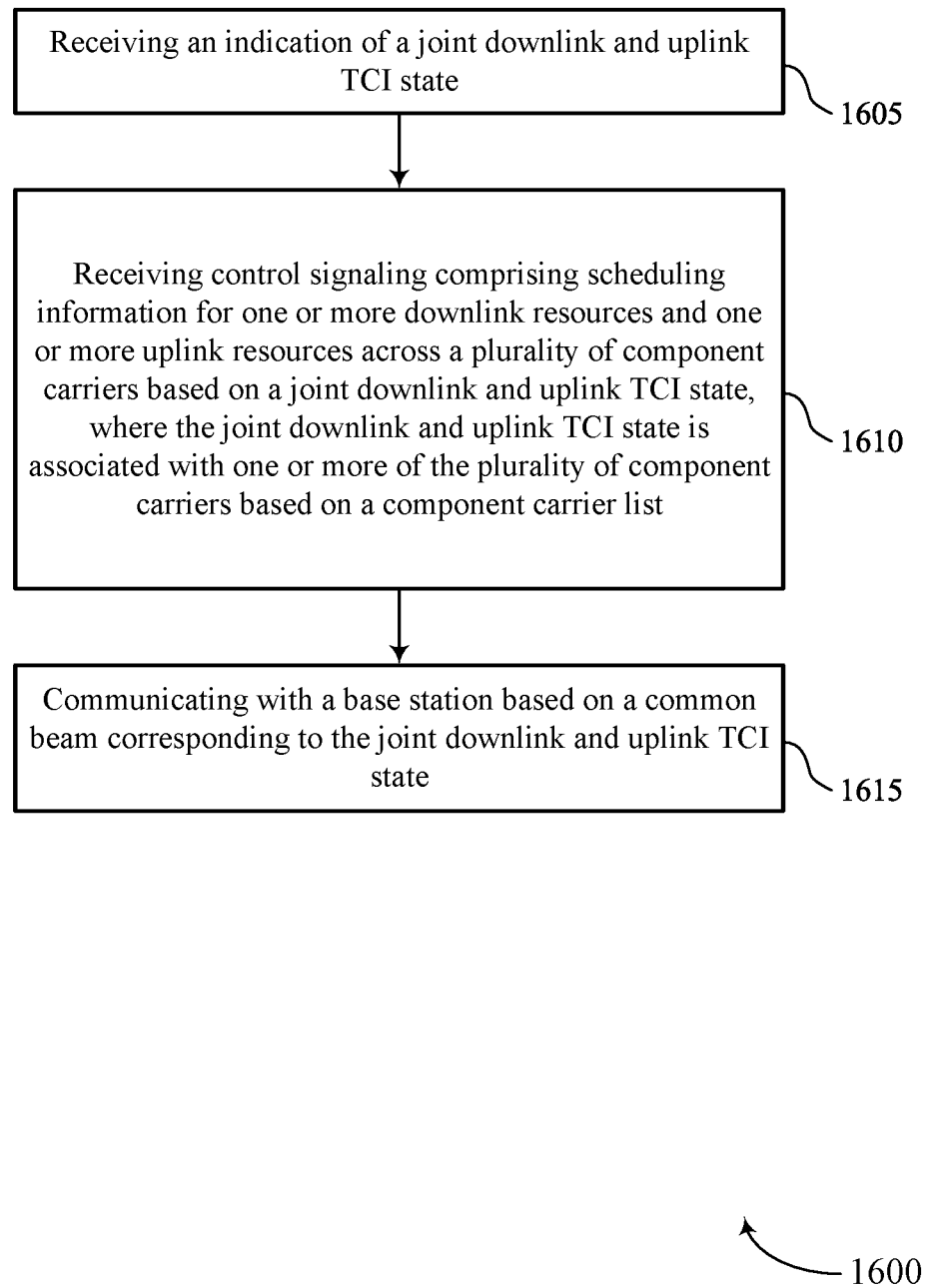

FIG. 16 shows a flowchart illustrating a method that supports techniques for cross-component carrier scheduling of a joint downlink and uplink TCI state in accordance with aspects of the present disclosure. The operations of a method 1600 may be implemented by a UE or its components as described herein. For example, the operations of the method 1600 may be performed by a UE 115, a UE 215, a UE 315, a UE 515, or a UE 615 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include receiving an indication of a joint downlink and uplink TCI state. The operations of 1605 may be performed in accordance with examples as disclosed herein. In some examples, aspects of the operations of 1605 may be performed by a TCI component 930 as described with reference to FIG. 9.

At 1610, the method may include receiving control signaling including scheduling information for one or more downlink resources and one or more uplink resources across a set of multiple component carriers based on the joint downlink and uplink TCI state, where the joint downlink and uplink TCI state is associated with one or more of the set of multiple component carriers based on a component carrier list. The operations of 1610 may be performed in accordance with examples as disclosed herein. In some examples, aspects of the operations of 1610 may be performed by a scheduling component 925 as described with reference to FIG. 9.

At 1615, the method may include communicating with a base station based on a common beam corresponding to the joint downlink and uplink TCI state. The operations of 1615 may be performed in accordance with examples as disclosed herein. In some examples, aspects of the operations of 1615 may be performed by a TCI component 930 as described with reference to FIG. 9.

Figure 17:
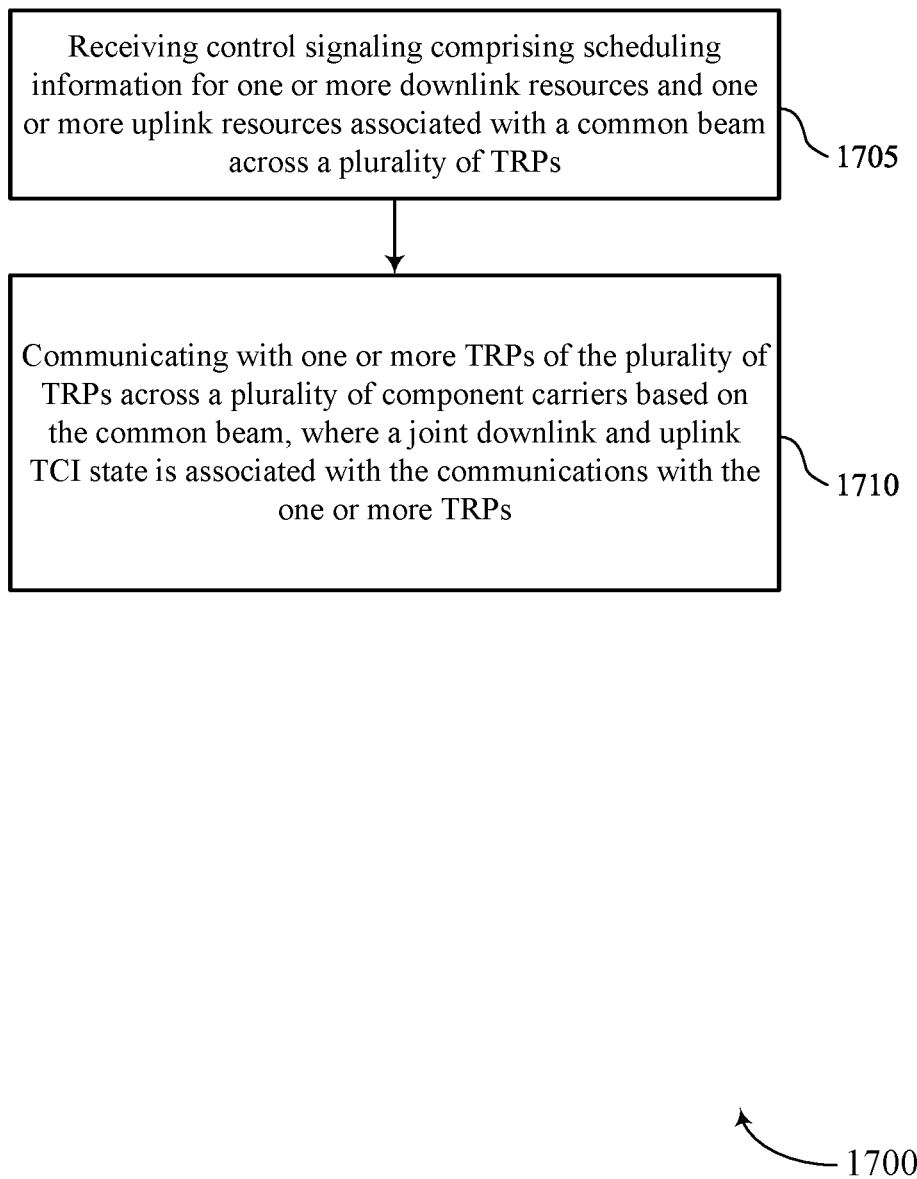

FIG. 17 shows a flowchart illustrating a method that supports techniques for cross-component carrier scheduling of a joint downlink and uplink TCI state in accordance with aspects of the present disclosure. The operations of a method 1700 may be implemented by a UE or its components as described herein. For example, the operations of the method 1700 may be performed by a UE 115, a UE 215, a UE 315, a UE 515, or a UE 615 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1705, the method may include receiving control signaling including scheduling information for one or more downlink resources and one or more uplink resources associated with a common beam across a set of multiple TRPs. The operations of 1705 may be performed in accordance with examples as disclosed herein. In some examples, aspects of the operations of 1705 may be performed by a scheduling component 925 as described with reference to FIG. 9.

At 1710, the method may include communicating with one or more TRPs of the set of multiple TRPs across a set of multiple component carriers based on the common beam, where a joint downlink and uplink TCI state is associated with the communications with the one or more TRPs. The operations of 1710 may be performed in accordance with examples as disclosed herein. In some examples, aspects of the operations of 1710 may be performed by a beam component 935 as described with reference to FIG. 9.

Figure 18:
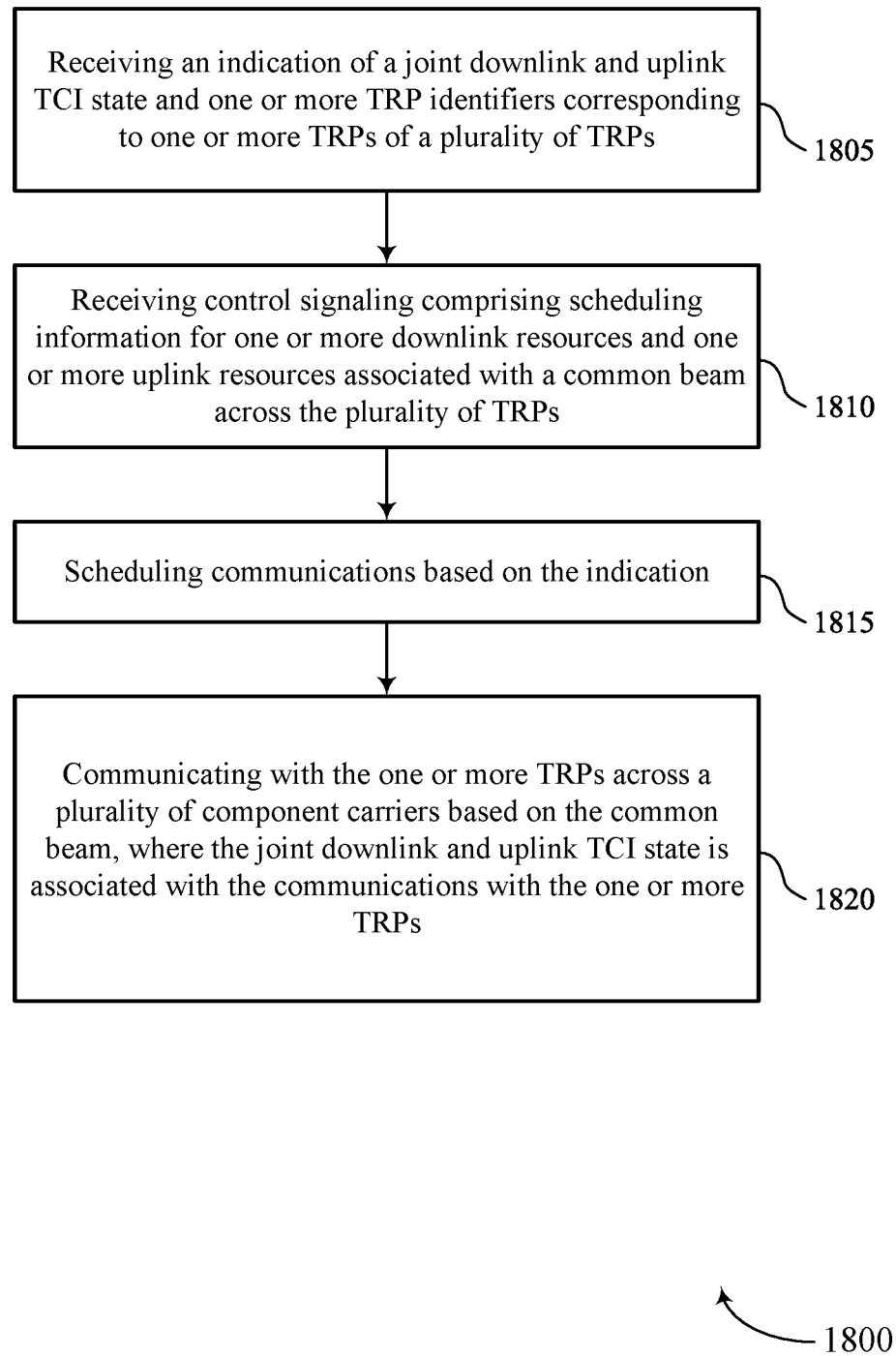

FIG. 18 shows a flowchart illustrating a method that supports techniques for cross-component carrier scheduling of a joint downlink and uplink TCI state in accordance with aspects of the present disclosure. The operations of a method 1800 may be implemented by a UE or its components as described herein. For example, the operations of the method 1800 may be performed by a UE 115, a UE 215, a UE 315, a UE 515, or a UE 615 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1805, the method may include receiving an indication of a joint downlink and uplink TCI state and one or more TRP identifiers corresponding to one or more TRPs of a set of multiple TRPs. The operations of 1805 may be performed in accordance with examples as disclosed herein. In some examples, aspects of the operations of 1805 may be performed by a TCI component 930 as described with reference to FIG. 9.

At 1810, the method may include receiving control signaling including scheduling information for one or more downlink resources and one or more uplink resources associated with a common beam across the set of multiple TRPs. The operations of 1810 may be performed in accordance with examples as disclosed herein. In some examples, aspects of the operations of 1810 may be performed by a scheduling component 925 as described with reference to FIG. 9.

At 1815, the method may include scheduling the communications based on the indication. The operations of 1815 may be performed in accordance with examples as disclosed herein. In some examples, aspects of the operations of 1815 may be performed by a scheduling component 925 as described with reference to FIG. 9.

At 1820, the method may include communicating with the one or more TRPs of the set of multiple TRPs across a set of multiple component carriers based on the common beam, where a joint downlink and uplink TCI state is associated with the communications with the one or more TRPs. The operations of 1820 may be performed in accordance with examples as disclosed herein. In some examples, aspects of the operations of 1820 may be performed by a beam component 935 as described with reference to FIG. 9.

Figure 19:
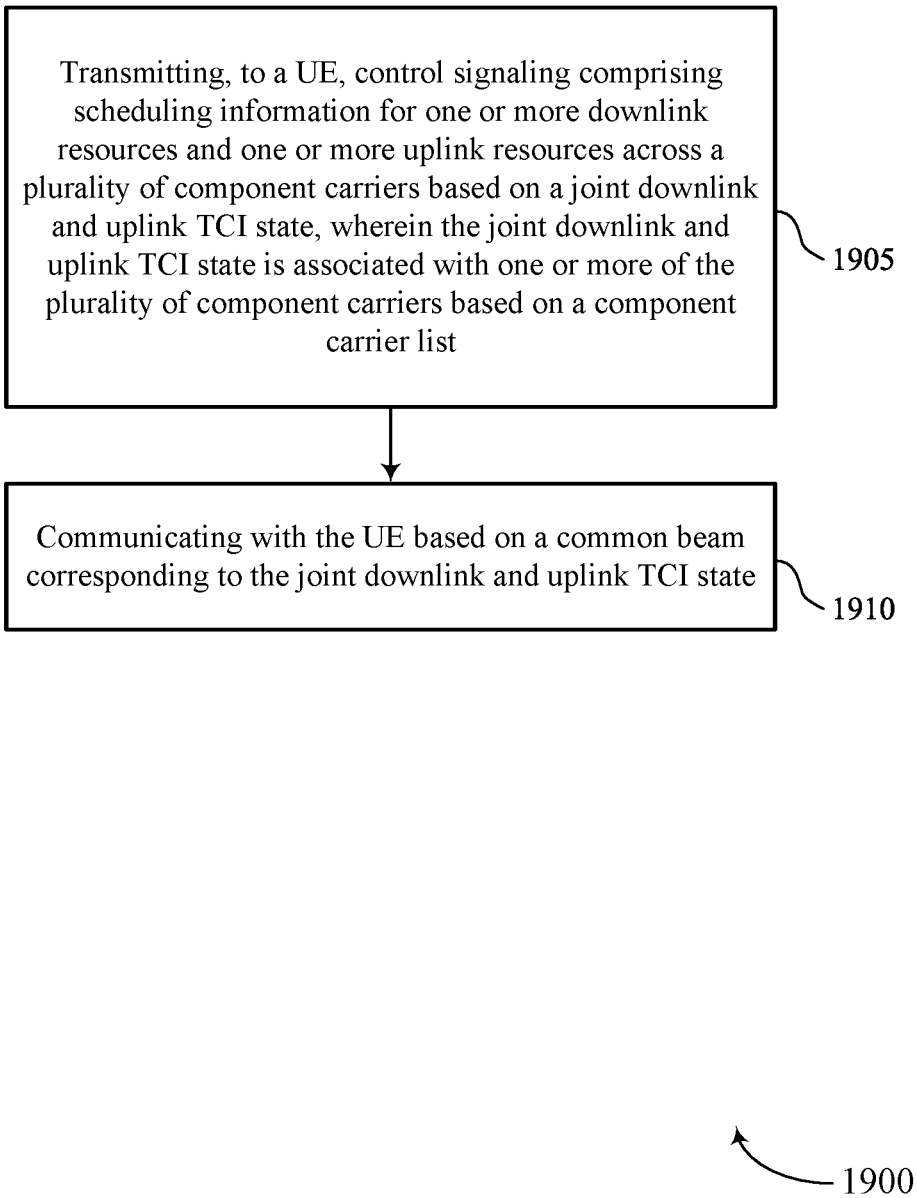

FIG. 19 shows a flowchart illustrating a method that supports techniques for cross-component carrier scheduling of a joint downlink and uplink TCI state in accordance with aspects of the present disclosure. The operations of a method 1900 may be implemented by a base station or its components as described herein. For example, the operations of the method 1900 may be performed by a base station 105, a base station 205, a TRP 305, or a TRP 605, as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1905, the method may include transmitting, to a UE, control signaling including scheduling information for one or more downlink resources and one or more uplink resources across a set of multiple component carriers based on a joint downlink and uplink TCI state, where the joint downlink and uplink TCI state is associated with one or more of the set of multiple component carriers based on a component carrier list. The operations of 1905 may be performed in accordance with examples as disclosed herein. In some examples, aspects of the operations of 1905 may be performed by a scheduling component 1325 as described with reference to FIG. 13.

At 1910, the method may include communicating with the UE based on a common beam corresponding to the joint downlink and uplink TCI state. The operations of 1910 may be performed in accordance with examples as disclosed herein. In some examples, aspects of the operations of 1910 may be performed by a TCI component 1330 as described with reference to FIG. 13.

Figure 20:
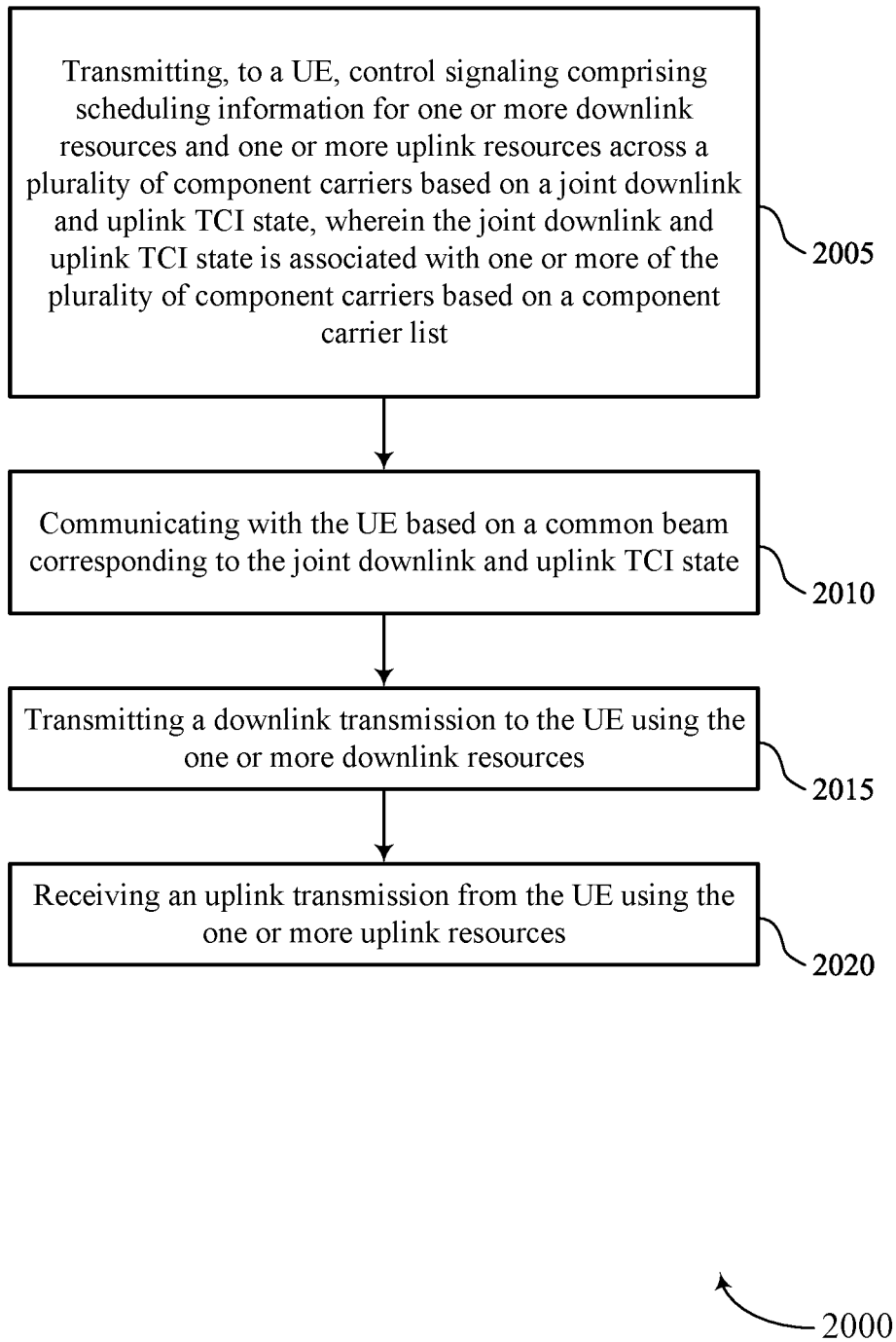

FIG. 20 shows a flowchart illustrating a method that supports techniques for cross-component carrier scheduling of a joint downlink and uplink TCI state in accordance with aspects of the present disclosure. The operations of a method 2000 may be implemented by a base station or its components as described herein. For example, the operations of the method 2000 may be performed by a base station 105, a base station 205, a TRP 305, or a TRP 605, as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 2005, the method may include transmitting, to a UE, control signaling including scheduling information for one or more downlink resources and one or more uplink resources across a set of multiple component carriers based on a joint downlink and uplink TCI state, where the joint downlink and uplink TCI state is associated with one or more of the set of multiple component carriers based on a component carrier list. The operations of 2005 may be performed in accordance with examples as disclosed herein. In some examples, aspects of the operations of 2005 may be performed by a scheduling component 1325 as described with reference to FIG. 13.

At 2010, the method may include communicating with the UE based on a common beam corresponding to the joint downlink and uplink TCI state. The operations of 2010 may be performed in accordance with examples as disclosed herein. In some examples, aspects of the operations of 2010 may be performed by a TCI component 1330 as described with reference to FIG. 13.

At 2015, the method may include transmitting a downlink transmission to the UE using the one or more downlink resources. The operations of 2015 may be performed in accordance with examples as disclosed herein. In some examples, aspects of the operations of 2015 may be performed by a scheduling component 1325 as described with reference to FIG. 13.

At 2020, the method may include receiving an uplink transmission from the UE using the one or more uplink resources. The operations of 2020 may be performed in accordance with examples as disclosed herein. In some examples, aspects of the operations of 2020 may be performed by a scheduling component 1325 as described with reference to FIG. 13.

The following provides an overview of aspects of the present disclosure:

Aspect 1: A method for wireless communications at a UE, comprising: receiving control signaling comprising scheduling information for one or more downlink resources and one or more uplink resources across a plurality of component carriers based at least in part on a joint downlink and uplink transmission configuration indicator state, wherein the joint downlink and uplink transmission configuration indicator state is associated with one or more of the plurality of component carriers based at least in part on a component carrier list; and communicating with a base station based at least in part on a common beam corresponding to the joint downlink and uplink transmission configuration indicator state.

Aspect 2: The method of aspect 1, wherein receiving the control signaling comprises: receiving an indication of the joint downlink and uplink transmission configuration indicator state.

Aspect 3: The method of aspect 2, wherein the indication is a field in the control signaling comprising a joint downlink and uplink transmission configuration indicator state identifier.

Aspect 4: The method of aspect 2, wherein the indication comprises a field in a scheduling request indicator.

Aspect 5: The method of any of aspects 1 through 4, wherein communicating with the base station comprises: receiving a downlink transmission from the base station using the one or more downlink resources; and transmitting an uplink transmission to the base station using the one or more uplink resources.

Aspect 6: The method of aspect 5, further comprising: scheduling the downlink transmission and the uplink transmission across the plurality of component carriers based at least in part on the plurality of component carriers sharing a same analog beam with the common beam corresponding to the joint downlink and uplink transmission configuration indictor state.

Aspect 7: The method of any of aspects 1 through 6, further comprising: receiving, from a component carrier of the plurality of component carriers, an indication of the common beam for one or more downlink channels and one or more uplink channels across the plurality of component carriers.

Aspect 8: The method of any of aspects 1 through 7, wherein receiving the control signaling comprises: receiving first control signaling comprising a first indication of the component carrier list, the component carrier list comprising the one or more of the plurality of component carriers; and receiving second control signaling comprising a second indication of the joint downlink and uplink transmission configuration indicator state.

Aspect 9: The method of aspect 8, wherein the one or more of the plurality of component carriers share a same analog beam.

Aspect 10: The method of any of aspects 8 through 9, wherein the one or more of the plurality of component carriers support the joint downlink and uplink transmission configuration indicator state.

Aspect 11: The method of any of aspects 8 through 9, wherein the one or more of the plurality of component carriers support a downlink transmission configuration indicator state or an uplink transmission configuration indicator state.

Aspect 12: A method for wireless communications at a UE, comprising: receiving control signaling comprising scheduling information for one or more downlink resources and one or more uplink resources associated with a common beam across a plurality of transmission reception points; communicating with one or more transmission reception points of the plurality of transmission reception points across a plurality of component carriers based at least in part on the common beam, wherein a joint downlink and uplink transmission configuration indicator state is associated with the communications with the one or more transmission reception points.

Aspect 13: The method of aspect 12, wherein receiving the control signaling further comprises: receiving an indication of the joint downlink and uplink transmission configuration indicator state and one or more transmission reception point identifiers corresponding to the one or more transmission reception points; and scheduling the communications based at least in part on the indication.

Aspect 14: The method of aspect 13, wherein the indication is a field in the control signaling comprising a joint downlink and uplink transmission configuration indicator state identifier and the one or more transmission reception point identifiers.

Aspect 15: The method of aspect 13, wherein the indication comprises a field in a scheduling request indicator.

Aspect 16: The method of any of aspects 12 through 15, wherein communicating with the one or more transmission reception points comprises: receiving a downlink transmission using the one or more downlink resources; and transmitting an uplink transmission using the one or more uplink resources.

Aspect 17: A method for wireless communications at a base station, comprising: transmitting, to a UE, control signaling comprising scheduling information for one or more downlink resources and one or more uplink resources across a plurality of component carriers based at least in part on a joint downlink and uplink transmission configuration indicator state, wherein the joint downlink and uplink transmission configuration indicator state is associated with one or more of the plurality of component carriers based at least in part on a component carrier list; communicating with the UE based at least in part on a common beam corresponding to the joint downlink and uplink transmission configuration indicator state.

Aspect 18: The method of aspect 17, wherein transmitting the control signaling comprises: transmitting an indication of the joint downlink and uplink transmission configuration indicator state.

Aspect 19: The method of aspect 18, wherein the indication is a field in the control signaling comprising a joint downlink and uplink transmission configuration indicator state identifier.

Aspect 20: The method of aspect 18, wherein the indication comprises a field in a scheduling request indicator.

Aspect 21: The method of any of aspects 17 through 20, wherein communicating with the UE comprises: transmitting a downlink transmission to the UE using the one or more downlink resources; and receiving an uplink transmission from the UE using the one or more uplink resources.

Aspect 22: The method of aspect 21, further comprising: scheduling the downlink transmission and the uplink transmission across the plurality of component carriers based at least in part on the plurality of component carriers sharing a same analog beam with the common beam corresponding to the joint downlink and uplink transmission configuration indictor state.

Aspect 23: The method of any of aspects 17 through 22, further comprising: transmitting, from a component carrier of the plurality of component carriers, an indication of the common beam for one or more downlink channels and one or more uplink channels across the plurality of component carriers.

Aspect 24: The method of any of aspects 17 through 23, wherein transmitting the control signaling comprises: transmitting first control signaling comprising a first indication of the component carrier list, the component carrier list comprising the one or more of the plurality of component carriers; and transmitting second control signaling comprising a second indication of the joint downlink and uplink transmission configuration indicator state.

Aspect 25: The method of aspect 24, wherein the one or more of the plurality of component carriers share a same analog beam.

Aspect 26: The method of any of aspects 24 through 25, wherein the one or more of the plurality of component carriers support the joint downlink and uplink transmission configuration indicator state.

Aspect 27: The method of any of aspects 24 through 25, wherein the one or more of the plurality of component carriers support a downlink transmission configuration indicator state or an uplink transmission configuration indicator state.

Aspect 28: An apparatus for wireless communications at a UE, comprising a processor; memory coupled with the processor; and instructions stored in the memory and executable by the processor to cause the apparatus to perform a method of any of aspects 1 through 11.

Aspect 29: An apparatus for wireless communications at a UE, comprising at least one means for performing a method of any of aspects 1 through 11.

Aspect 30: A non-transitory computer-readable medium storing code for wireless communications at a UE, the code comprising instructions executable by a processor to perform a method of any of aspects 1 through 11.

Aspect 31: An apparatus for wireless communications at a UE, comprising a processor; memory coupled with the processor; and instructions stored in the memory and executable by the processor to cause the apparatus to perform a method of any of aspects 12 through 16.

Aspect 32: An apparatus for wireless communications at a UE, comprising at least one means for performing a method of any of aspects 12 through 16.

Aspect 33: A non-transitory computer-readable medium storing code for wireless communications at a UE, the code comprising instructions executable by a processor to perform a method of any of aspects 12 through 16.

Aspect 34: An apparatus for wireless communications at a base station, comprising a processor; memory coupled with the processor; and instructions stored in the memory and executable by the processor to cause the apparatus to perform a method of any of aspects 17 through 27.

Aspect 35: An apparatus for wireless communications at a base station, comprising at least one means for performing a method of any of aspects 17 through 27.

Aspect 36: A non-transitory computer-readable medium storing code for wireless communications at a base station, the code comprising instructions executable by a processor to perform a method of any of aspects 17 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving first control signaling indicating a component carrier list, the component carrier list comprising one or more component carriers of a set of component carriers;
   receiving second control signaling comprising scheduling information for one or more downlink resources and one or more uplink resources across the set of component carriers based at least in part on a joint downlink and uplink transmission configuration indicator state, wherein the joint downlink and uplink transmission configuration indicator state is associated with the one or more component carriers of the set of component carriers of the component carrier list; and
   communicating with a network entity based at least in part on a common beam corresponding to the joint downlink and uplink transmission configuration indicator state.

2. The method of claim 1, wherein receiving the second control signaling comprises:
   receiving an indication of the joint downlink and uplink transmission configuration indicator state.

3. The method of claim 2, wherein the indication is a field in the second control signaling comprising a joint downlink and uplink transmission configuration indicator state identifier.

4. The method of claim 2, wherein the indication comprises a field in a scheduling request indicator.

5. The method of claim 1, wherein communicating with the network entity comprises:
   receiving a downlink transmission from the network entity using the one or more downlink resources; and
   transmitting an uplink transmission to the network entity using the one or more uplink resources.

6. The method of claim 5, further comprising:
   scheduling the downlink transmission and the uplink transmission across the set of component carriers based at least in part on the set of component carriers sharing a same analog beam with the common beam corresponding to the joint downlink and uplink transmission configuration indicator state.

7. The method of claim 1, further comprising:
   receiving, from a component carrier of the set of component carriers, an indication of the common beam for one or more downlink channels and one or more uplink channels across the set of component carriers.

8. The method of claim 1, wherein:
   the second control signaling comprising an indication of the joint downlink and uplink transmission configuration indicator state.

9. The method of claim 8, wherein the one or more component carriers of the set of component carriers share a same analog beam.

10. The method of claim 8, wherein the one or more component carriers of the set of component carriers support the joint downlink and uplink transmission configuration indicator state.

11. The method of claim 8, wherein the one or more component carriers of the set of component carriers support a downlink transmission configuration indicator state or an uplink transmission configuration indicator state.

12. A method for wireless communications at a user equipment (UE), comprising:
   receiving first control signaling indicating a component carrier list, the component carrier list comprising one or more component carriers of a set of component carriers;
   receiving second control signaling comprising scheduling information for one or more downlink resources and one or more uplink resources associated with a common beam across a plurality of transmission reception points; and communicating with one or more transmission reception points of the plurality of transmission reception points across the set of component carriers based at least in part on the common beam and the component carrier list, wherein a joint downlink and uplink transmission configuration indicator state is associated with the communications with the one or more transmission reception points.

13. The method of claim 12, wherein receiving the second control signaling further comprises:
receiving an indication of the joint downlink and uplink transmission configuration indicator state and one or more transmission reception point identifiers corresponding to the one or more transmission reception points; and
scheduling the communications based at least in part on the indication.

14. The method of claim 13, wherein the indication is a field in the second control signaling comprising a joint downlink and uplink transmission configuration indicator state identifier and the one or more transmission reception point identifiers.

15. The method of claim 13, wherein the indication comprises a field in a scheduling request indicator.

16. The method of claim 12, wherein communicating with the one or more transmission reception points comprises:
receiving a downlink transmission using the one or more downlink resources; and
transmitting an uplink transmission using the one or more uplink resources.

17. A method for wireless communications at a network entity, comprising:
transmitting first control signaling indicating a component carrier list, the component carrier list comprising one or more component carriers of a set of component carriers;
transmitting second control signaling comprising scheduling information for one or more downlink resources and one or more uplink resources across the set of component carriers based at least in part on a joint downlink and uplink transmission configuration indicator state, wherein the joint downlink and uplink transmission configuration indicator state is associated with the one or more component carriers of the set of component carriers of the component carrier list; and
communicating with a user equipment (UE) based at least in part on a common beam corresponding to the joint downlink and uplink transmission configuration indicator state.

18. The method of claim 17, wherein transmitting the second control signaling comprises:
transmitting an indication of the joint downlink and uplink transmission configuration indicator state.

19. The method of claim 18, wherein the indication is a field in the second control signaling comprising a joint downlink and uplink transmission configuration indicator state identifier.

20. The method of claim 18, wherein the indication comprises a field in a scheduling request indicator.

21. The method of claim 17, wherein communicating with the UE comprises:
transmitting a downlink transmission to the UE using the one or more downlink resources; and
receiving an uplink transmission from the UE using the one or more uplink resources.

22. The method of claim 21, further comprising:
scheduling the downlink transmission and the uplink transmission across the set of component carriers based at least in part on the set of component carriers sharing a same analog beam with the common beam corresponding to the joint downlink and uplink transmission configuration indicator state.

23. The method of claim 17, further comprising:
transmitting, from a component carrier of the set of component carriers, an indication of the common beam for one or more downlink channels and one or more uplink channels across the set of component carriers.

24. The method of claim 17, wherein
the second control signaling comprising an indication of the joint downlink and uplink transmission configuration indicator state.

25. The method of claim 24, wherein the one or more component carriers of the set of component carriers share a same analog beam.

26. The method of claim 24, wherein the one or more component carriers of the set of component carriers support the joint downlink and uplink transmission configuration indicator state.

27. The method of claim 24, wherein the one or more component carriers of the set of component carriers support a downlink transmission configuration indicator state or an uplink transmission configuration indicator state.

28. An apparatus for wireless communications at a user equipment (UE), comprising:
a processor;
memory coupled with the processor; and
instructions stored in the memory and executable by the processor to cause the apparatus to:
receive first control signaling indicating a component carrier list, the component carrier list comprising one or more component carriers of a set of component carriers;
receive second control signaling comprising scheduling information for one or more downlink resources and one or more uplink resources across the set of component carriers based at least in part on a joint downlink and uplink transmission configuration indicator state, wherein the joint downlink and uplink transmission configuration indicator state is associated with the one or more component carriers of the set of component carriers of the component carrier list; and
communicate with a network entity based at least in part on a common beam corresponding to the joint downlink and uplink transmission configuration indicator state.

29. The apparatus of claim 28, wherein the instructions to receive the second control signaling are executable by the processor to cause the apparatus to:
receive an indication of the joint downlink and uplink transmission configuration indicator state.

30. The apparatus of claim 28, wherein the instructions to communicate with the network entity are executable by the processor to cause the apparatus to:
receive a downlink transmission from the network entity using the one or more downlink resources; and
transmit an uplink transmission to the network entity using the one or more uplink resources.

* * * * *